INPUT-OUTPUT SYSTEM FOR DIGITAL COMPUTER

Filed Aug. 31, 1960

*INVENTORS*
ROBERT L. McINTYRE
CHARLES E. SAUNDERS
DALE V. SCHMIDT
BY
ATTORNEY

FIG.6
| UP-DOWN COUNTER SELECTED | FLIP-FLOP CONFIGURATION A4 | A5 | A6 |
|---|---|---|---|
| a | 1 | 0 | 0 |
| b | 0 | 1 | 0 |
| c | 1 | 1 | 0 |
| d | 0 | 0 | 1 |
| e | 1 | 0 | 1 |
| f | 0 | 1 | 1 |
| g | 1 | 1 | 1 |
| h | 0 | 0 | 0 |
FIG. 8
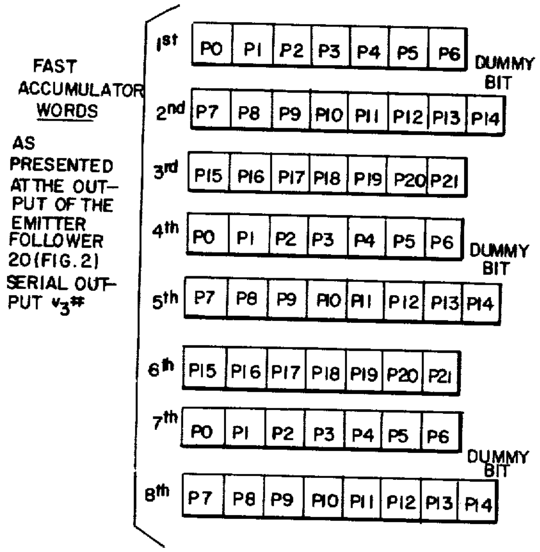
FIG.7
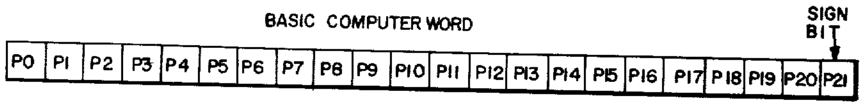
FIG.9
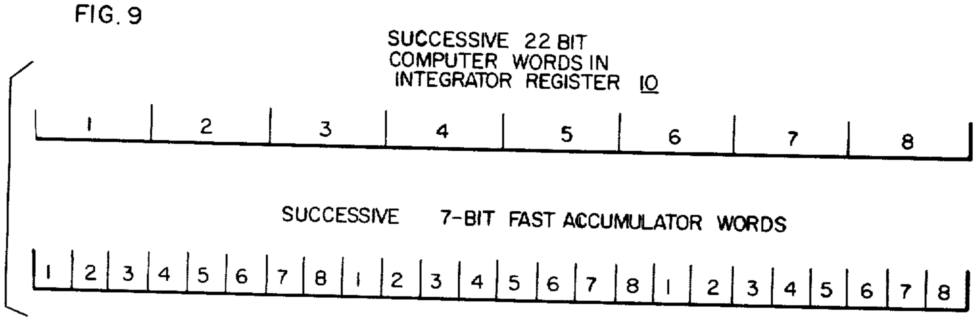

Oct. 8, 1963 R. L. McINTYRE ETAL 3,106,636

INPUT-OUTPUT SYSTEM FOR DIGITAL COMPUTER

Filed Aug. 31, 1960 15 Sheets-Sheet 8

NEGATIVE INCREMENT FLIP-FLOP A1

POSITIVE INCREMENT FLIP-FLOP A2

Oct. 8, 1963 R. L. McINTYRE ETAL 3,106,636

INPUT-OUTPUT SYSTEM FOR DIGITAL COMPUTER

Filed Aug. 31, 1960

15 Sheets-Sheet 9

| FLIP-FLOP | | | G1 | G2 | G3 | G4 |
|---|---|---|---|---|---|---|
| TIME SIGNAL OUT | #1 | CODE | 1 | 0 | 0 | 0 |
| TIME SIGNAL OUT | #2 | CODE | 1 | 0 | 1 | 0 |
| TIME SIGNAL OUT | #3 | CODE | 1 | 0 | 0 | 1 |
| TIME SIGNAL OUT | #4 | CODE | 1 | 0 | 1 | 1 |
| ELEVATION OUTPUT | | | 1 | 1 | 0 | 0 |
| AZIMUTH OUTPUT | | | 1 | 1 | 1 | 0 |
| ALTITUDE OUTPUT | | | 1 | 1 | 0 | 1 |
| INPUT | | | 0 | 1 | X | X |
| INTEGRATION | FIRST WORD | | 0 | 0 | 1 | 1 |
| INTEGRATION | SECOND WORD | | 0 | 0 | 0 | 0 |
| INTEGRATION | SECOND WORD | | 0 | 0 | 0 | 1 |
| INTEGRATION | SECOND WORD | | 0 | 0 | 1 | 0 |

INPUT FLIP-FLOP INTEGRATOR ADDER

CARRY FLIP-FLOP
INTEGRATOR ADDER

Oct. 8, 1963 R. L. McINTYRE ETAL 3,106,636

INPUT-OUTPUT SYSTEM FOR DIGITAL COMPUTER

Filed Aug. 31, 1960 15 Sheets-Sheet 15

3,106,636

INPUT-OUTPUT SYSTEM FOR DIGITAL COMPUTER

Robert L. McIntyre, Elmsford, N.Y., and Charles F. Saunders, Sunland, and Dale V. Schmidt, Pacoima, Calif., assignors to General Precision, Inc., a corporation of Delaware Filed Aug. 31, 1960, Ser. No. 53,120
10 Claims. (Cl. 235—165)

The present invention relates to electronic digital computers, and the like, and it relates more particularly to an improved input-output auxiliary computer system for use with a general purpose electronic digital computer.

An important object of the present invention is to provide an improved input-output system to be used in conjunction with a general purpose computer to extend the capabilities of the general purpose computer so as to enable such a computer to be used, for example, in vehicle guidance systems. In most prior art vehicle guidance systems, the guidance of the vehicle was controlled from a remote control station through telemetering radiation communication links. This use of radiation links rendered such prior art guidance systems susceptible to interruptions and delays due to the dependence of such systems upon the vagaries of such links.

The input-output auxiliary computer system of the present invention permits a general purpose computer to be mounted in the vehicle itself, and it provides the computer with various inputs to enable the computer to control the guidance of the vehicle. The vehicle, for example, may include suitable inertial instruments which supply velocity increment signals to the improved input-out systems of the invention, and the input-output system is capable of accumulating these signals and of transforming them into digital information representing, for example, velocity, distance and time terms, so that suitable digital inputs may be fed to the general purpose computer for computation purposes. The improved system of the invention is also capable of responding to resulting outputs from the computer to produce analogue quantities related, for example, to the required azimuth, elevation and altitude of the vehicle for controlling the course of the vehicle.

In the system to be described, for example, the general purpose computer is coupled to the input-output system of the invention in such a manner that at all times the general purpose computer is in complete control of the input-output system. The input-output system to be described, for example, receives its inputs from four different instrument sources within the inertial platform of the vehicle and supplies its outputs to the various guidance control units in the vehicle. Each of the instrument sources generates information in the form of pulses recurring, for example, at the rate of 2400 pulses per second. These pulses may represent, for example, velocity increments of the vehicle along different axes.

The signal from the instrument sources in the inertial platform of the vehicle are fed into a fast accumulator which is incorporated in the input-output system of the invention, and which has a capacity, for example, to accept 2400 pulses per second. A stored program within the computer sets up the pattern for selection of the different sets of input pulses by the fast accumulator section of the input-output system.

The input-output system of the invention also includes an integrator register. Information from the fast accumulator in the input-output system of the invention is periodically transferred to the integrator register. Velocity information is provided by the integrator in digital form for subsequent application to the general purpose computer. The integrator section of the input-output system of the invention is also capable of generating its own real time signals which serve as inputs to the general purpose computer, and of providing count-down time signals. The integrator section of the input-output system is capable of integrating the velocity information to to provide distance terms in digital form for the general purpose computer. This section is also capable of generating output signals for controlling digital-to-analogue converters which, in turn, provide azimuth, elevation and altitude guidance controls for the vehicle.

More specifically, the particular embodiment of the input-output system to be described has the following capabilities: It is capable of receiving information representative of velocity changes from the inertial guidance platform of the vehicle and of summing this information to maintain accurate data on the velocity of the vehicle in space at any instant. The input-output system to be described is also capable of integrating the velocity data to provide distance terms which indicate the position of the vehicle in space at any given instant. The input-output system is also capable of controlling digital-to-analogue converters so that appropriate guidance control information may be fed to the vehicle from the computer system. The input-output system of the invention can also control external flip-flops on the basis of a plurality of time signal count downs. The input-output system to be described can also accumulate real time increments and make these accumulations available for computational purposes.

The features of the invention which are believed to be new are set forth in the claims. The invention itself may best be understood by reference to the following specification when considered in conjunction with the accompanying drawings in which:

FIGURE 6 is a table showing the various configurations of a group of flip-flops included in the selection system of FIGURE 3, and selectively actuating the matrix in FIGURE 3;

FIGURE 7 is a schematic representation of a multi-digit word of the type used in the general purpose computer associated with the input-output system of the invention;

FIGURE 8 is a schematic representation of the composition of a plurality of words contained in the fast accumulator register of FIGURE 2;

FIGURE 9 is a diagram illustrating the manner in which the words in the fast accumulator register of FIGURE 2 successively line up with the words used in the general purpose computer;

In a manner to be described, information from the inertial platform of the vehicle, in the form of velocity pulses, is written into the fast accumulator; and at intervals which occur, for example, after each $\frac{1}{2400}$ second. During such intervals, numbers representative of different accumulations of the velocity pulses are added to corresponding numbers stored in the integrator register at different word positions and which are representative of the velocity of the vehicle along selected axes. In another operation the velocity numbers are selectively multiplied by a time increment, and the resulting products are added to corresponding numbers representative of different distance terms, which are also stored in the integrator register. These latter terms, therefore, represent distance vectos along different axes, these being representative of the distance travelled by the vehicle at any given time. The above operations may all be referred to as the input function of the input-output system of the invention.

The input-output system to be described is also capable of recurrently adding a negative time increment to each of a plurality of different pre-determined numbers stored in the integrator register, and the resulting "count down" signals are each used to control a different flip-flop which, in turn, controls some external unit. The negative time increments are also accumulated in the input-output system and used to provide a number representing elapsed real time from a particular reference. The input-output system to be described also includes numbers stored in the integrator register to control a plurality of digital-to-analogue output converters. The angular positions of these converters are used to control certain external units in an analogue manner to control the guidance of the vehicle. These latter operations may all be referred to as the output function of the input-output system of the invention.

The following terms and symbols will be used in the specification:

A1—negative increment input flip-flop for fast accumulator adder.

A2—positive increment input flip-flop for fast accumulator adder.

A3—delay flip-flop for fast accumulator adder.

A4, A5, A6—platform input selection counter.

V3—read amplifier for fast accumulator.

$v_3$—write amplifier for fast accumulator.

$v_3^{\#}$ —emitter follower output of fast accumulator adder.

E1—input flip-flop for integrator adder.

E2—carry flip-flop for the integrator adder, error detector flip-flop for the integrator adder during output mode, and control flip-flop for the integrator adder during other modes.

G1, G2—operation control flip-flops for the integrator.

G3, G4—selection flip-flops for the integrator.

F1—time increment storage flip-flop.

F2—time sequence control flip-flop.

F3, F4, F5 and F6—discrete time output flip-flops.

ΔF—signal from the time standard source.

Figure 1:
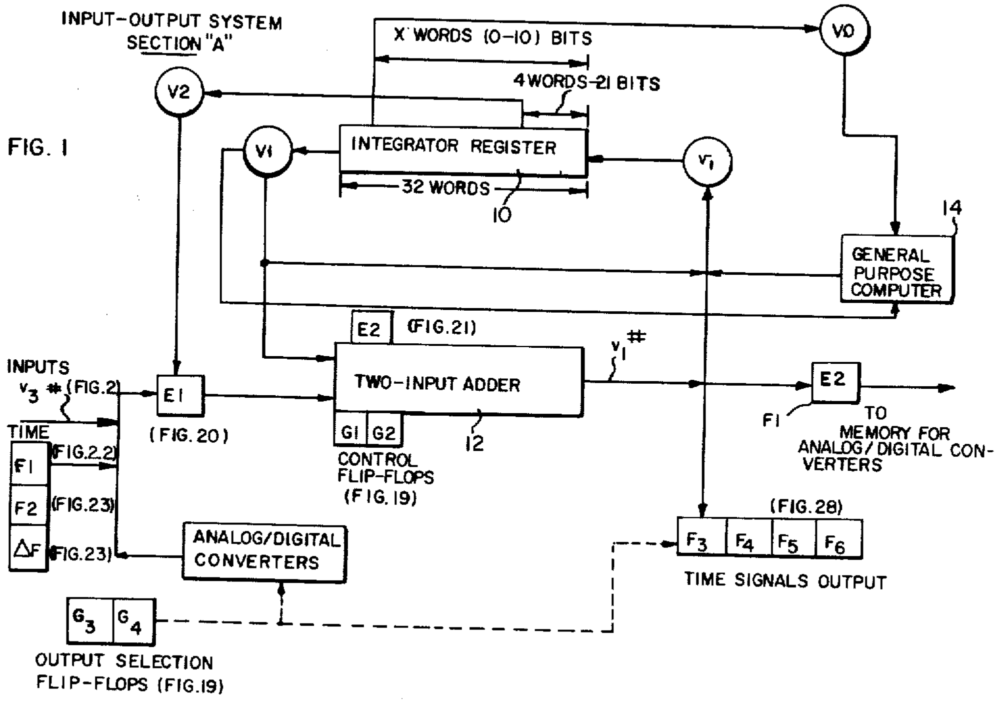
FIGURE 1 is a schematic representation of a first section of the input-output system of the invention, this first section including an integrator register and associated components.
Figure 2:
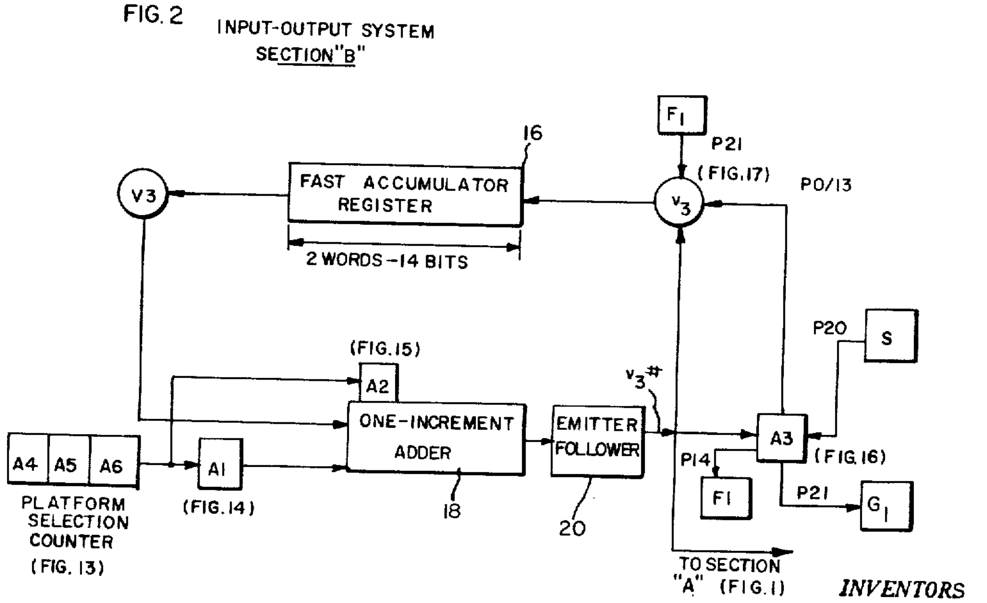
FIGURE 2 is a schematic representation of a second section of the input-output system of the invention, the second section including a fast accumulator register and associated components.

One embodiment of the input-output system of the invention is illustrated schematically in FIGURES 1 and 2. The system consists of two major sections, namely, section "A" and section "B." The section "A" is the integrator section and the section "B" is the fast accumulator section. The section "B" performs fast accumulations from information received from the inertial platform of the vehicle, and at a rate, for example, 2400 times per second. The section "A" performs integrations to an accuracy of, for example, 22 feet. The section "A" also serves to accumulate input information from the fast accumulator section "B" to an accuracy of, for example, 0.25 feet per second. Moreover, the section "A" also serves to generate time or "time to go" signals, and it is capable of generating output signals to control digital-to-analogue converters.

The system illustrated schematically in FIGURE 1 represents the integrator section "A" of the input-output system. This section includes an integrator register 10 which may, for example, be 32 words in length. A two-input adder 12 is also included in the integrator section "A." The write amplifier $v_1$ is coupled to the integrator register, as are the read amplifiers V1 and V2. The read head associated with the read amplifier V1 is spaced thirty-two words from the write head associated with the write amplifier $v_1$. The read head associated with the read amplifier V2 is spaced four words and twenty-one bits from the write head associated with the write amplifier $v_1$. A further read amplifier V0 may be included. The read head associated with the latter read amplifier may be movable, and that read head is spaced X words and 10–20 bits from the write head associated with the write amplifier $v_1$.

The read amplifier V2 is coupled to the input flip-flop

E1 of the integrator two-input adder 12, and the output from that flip-flop forms one of the inputs to the adder. The output from the read amplifier V1 constitutes the second input for the two-input adder 12. The emitter follower output $v_3^{\#}$ from the fast accumulator adder of FIGURE 2 forms one of the inputs to the flip-flop E1 for an input operation. The time flip-flops F1 and F2 also form an input to the flip-flop E1 for count down and real time accumulation operations. In addition, the output from one of a group of anologue-to-digital converters (selected by the flip-flop G3, G4) also forms an input for the flip-flop E1, for a digital-to-analogue output operation.

The output from the read amplifier V0 is introduced to a general purpose computer 14 which is associated with the input-output system of the invention and which controls the input-output system. The read amplifier V1 is also coupled to the general purpose computer 14, and the latter read amplifier also introduces its output to the write amplifier $v_1$ to form a recirculation loop for the integrator register 10.

The output $v_1^{\#}$ from the two-input adder 12 is also introduced to the write amplifier $v_1$. The general purpose computer 14 also introduces an output to the write amplifier $v_1$. The output $v_1^{\#}$ from the adder 12 is also introduced to a flip-flop E2; this flip-flop serving to control a memory, which, in turn, controls the analogue-to-digital converters during the output operation.

The integrator register 10 is a thirty-two word recirculation register, and each of its different operations occurs twice for each revolution of the magnetic memory drum of the general purpose computer. This drum is to be described in conjunction with FIGURE 10. The integrator register 10 contains the following data:

(*a*) Four different velocity terms.
(*b*) Four different distance terms.
(*c*) Four count down controls.
(*d*) One value of real time.
(*e*) Three values to be used by the digital-to-analogue output converters.

The section "B" of the input-output system is illustrated in FIGURE 2. This latter section includes a fast accumulator register 16, which may, for example, be two words and fourteen bits in length. Both the integrator register 10 of FIGURE 1 and the fast accumulator register 16 of FIGURE 2 may be of the circulating type, and may include particular respective tracks on the main memory drum of the general purpose computer 14 of FIGURE 1.

The write amplifier $v_3$ is coupled to an appropriate write head which is associated with the fast accumulator register 16. A suitable read head is coupled to the accumulator register 16, and that read head introduces its output to the read amplifier V3. The read amplifier V3 and the flip-flop A1 are coupled to the input terminals of a one-increment adder 18. The output of the adder 18 is coupled to an emitter follower 20 which produces an output $v_3^{\#}$. The output signal $v_3^{\#}$ is introduced to the flip-flop A3 and to the write amplifier $v_3$. This output signal is also applied to the flip-flop E1 in FIGURE 1.

The flip-flops F1 and A3 are also coupled to the write amplifier $v_3$. A flip-flop S (FIGURE 10) is coupled to the flip-flop A3. The flip-flop A3 is also coupled to the flip-flop G1. The inputs from the inertial platform are introduced to the flip-flops A1 and A2 associated with the adder 18 in FIGURE 2 in a manner to be described, and under the selection of the flip-flops A4, A5 and A6. More specifically, inputs from the up-down counters associated with the inertial platform of the vehicle are fed to the flip-flops A1 and A2. As noted, eight up-down counters may be provided (although four only are used in the particular embodiment of the invention under consideration) and these counters each supply pulses on a first lead to the flip-flop (A2) for positive increments of the corresponding velocity function and on a second lead to the flip-flop (A1) for negative increments of the corresponding velocity function. The counters are selected under the control of the flip-flops A4, A5, A6 so that the positive and negative increments may be received at the appropriate times to be added to the accumulated increments of the corresponding functions stored in the fast accumulator register 16.

Figure 3:
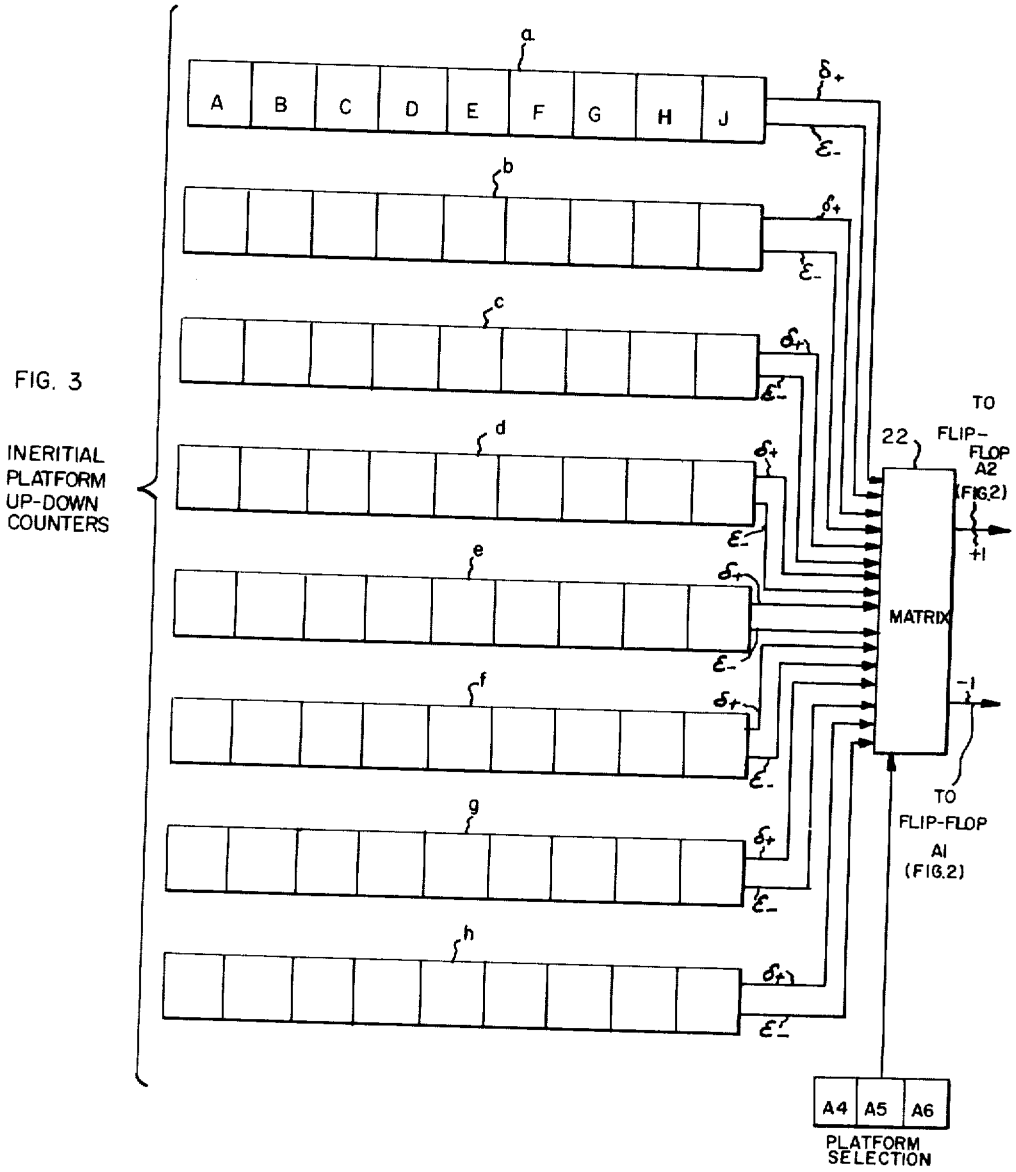
FIGURE 3 is a block diagram of a plurality of up-down counters which are associated with an inertial platform included in the vehicle in which the system of the invention may be installed, and this diagram also illustrates a matrix and selection system which are coupled to the counters.

As shown in FIGURE 3, eight up-down counters *a*, *b*, *c*, *d*, *e*, *f*, *g* and *h* are assumed to be associated with the inertial platform of the vehicle. These counters each have a $\delta+$ lead and an $\epsilon-$ lead extending to a matrix 22. The matrix 22 is controlled by the flip-flops A4, A5, A6 so that the signals on each pair of $\delta+$, $\epsilon-$ leads may be selectively introduced to the fast accumulator. In each instance, any signal appearing on the $\delta+$ lead of the selected counter is introduced to the flip-flop (A2) of FIGURE 2, and any signal appearing on the $\epsilon-$ lead of the selected counter is introduced to the flip-flop (A1) of FIGURE 2. A signal may be considered as appearing on one of the leads $\delta+$ when that lead is set high, which in turn occurs when the corresponding counter exhibits a positive count beyond a pre-determined threshold. Likewise, a signal may be considered as appearing on a lead $\epsilon-$ when that lead is set high, and that occurs when the corresponding counter exhibits a negative count beyond a pre-determined threshold.

Figure 4:
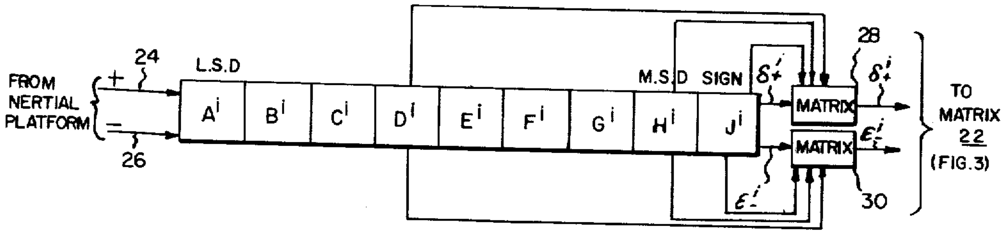
FIGURE 4 is a block diagram of one of the counters of FIGURE 3, and this latter diagram illustrates further components associated with that counter.

As shown in FIGURE 4, any one of the up-down counters of the group of FIGURE 3 (designated as the *i*th counter) is composed of a plurality of flip-flops $A^i$, $B^i$, $C^i$, $D^i$, $E^i$, $F^i$, $G^i$, $H^i$, $J^i$. These flip-flops are interconnected in known manner to form a usual up-down counter. Random pulses are supplied to the counter from the inertial platform over a pair of leads 24 and 26. Whenever a pulse appears on the lead 24 indicating a positive increment of the corresponding function (such as a velocity increment along a particular axis), the *i*th counter steps up one step. Likewise, whenever a pulse appears on the lead 26 indicating a negative increment of the corresponding function, the *i*th counter steps down one step. The outputs from the counter are fed respectively to a pair of matrices 28 and 30. These matrices are controlled by the flip-flops of the counter, and they are connected by way of the leads $\delta+^1$ and $\epsilon-^1$ to the matrix 22 in FIGURE 3.

The least significant digit may be stored in the counter $A^i$ flip-flop, and the most significant digit may be stored in the $H^i$ flip-flop. The sign digit is stored in the $J^i$ flip-flop. The counter is shifted through the configurations shown in FIGURE 5 in response to the positive and negative increment pulses received from the inertial platform. The counter is sampled to set its plus lead $\delta+^1$ high when the positive count reaches a level such that the flip-flop $H^i$ is set true. Likewise, the counter is sampled to set its minus lead $\epsilon-^1$ high when the negative count reaches a level such that the flip-flop $H^i$ is set low.

Whenever the counter of FIGURE 4 is sampled, it is apparent that the positive or negative increment taken from it and introduced to the fast accumulator Section "B" of FIGURE 2 must be subtracted from the count in the counter. To simplify the logic circuitry required for this operation, the matrix 28 is controlled to set the lead $\delta+^1$ high so that a positive increment may be accepted from the counter by the fast accumulator section only after the counter has been stepped positively to a point at which the count has reached at least the flip-flop $D^i$. Likewise, the matrix 30 is controlled so that the lead $\epsilon-^1$ is set high to permit a negative increment to be accepted by the fast accumulator section only when the counter has been stepped negatively to a point at which the count has reached at least the flip-flop $D^i$. This means that before a positive increment signal can be introduced to the fast accumulator section, the flip-flop $H^i$ must be true; and at least one of the flip-flops $D^i$, $E^i$, $F^i$ or $G^i$ must be true. Likewise, before a negative increment signal can be introduced to the fast accumulator, the flip-flop $H^i$ must be false, and at least one of the flip-flops $D^i$, $E^i$, $F^1$ or $G^1$ must be false. In addition, the sign flip-flop $J^1$ must be false to represent a positive count, and the flip-flop $J^1$ must be true to represent a negative count. Expressed logically:

$$\delta+^1=(\overline{D}^1+\overline{E}^1+\overline{F}^1+\overline{G}^1)\overline{H}^1.J^1$$

$$\epsilon-^1=(\overline{D}^1+\overline{E}^1+\overline{F}^1+\overline{G}^1)\overline{H}^1.\overline{J}^1$$

The matrices 28 and 30 of FIGURE 4 are controlled in accordance with respective ones of the above logic equations so that the conditions described above may obtain. Then, the receipt of positive increment pulses or negative increment pulses from the inertial platform during the sampling intervals will not be in sufficient number to set the counter to the 111111100 configuration or to the 000000011 configuration, the relative timing of the inertial platform pulses and of the sampling intervals being selected to establish this condition. Therefore, in each instance, when a positive or negative increment has been removed from the counter, the counter can be reset merely by setting the flip-flop $H^1$ false for a positive increment or true for a negative increment.

As noted above, the matrix 22 in FIGURE 3 is under the control of the flip-flops A4, A5 and A6. These flip-flops select different ones of the up-down counters, *a, b, c, d, e, f, g* and *h* of FIGURE 3 in accordance, for example, with the code table of FIGURE 6. These flip-flops A4, A5 and A6 are connected as a simple counter, and the counter is controlled to actuate from one configuration to the next at P4, P11 and P19 bit times.

Figure 11:
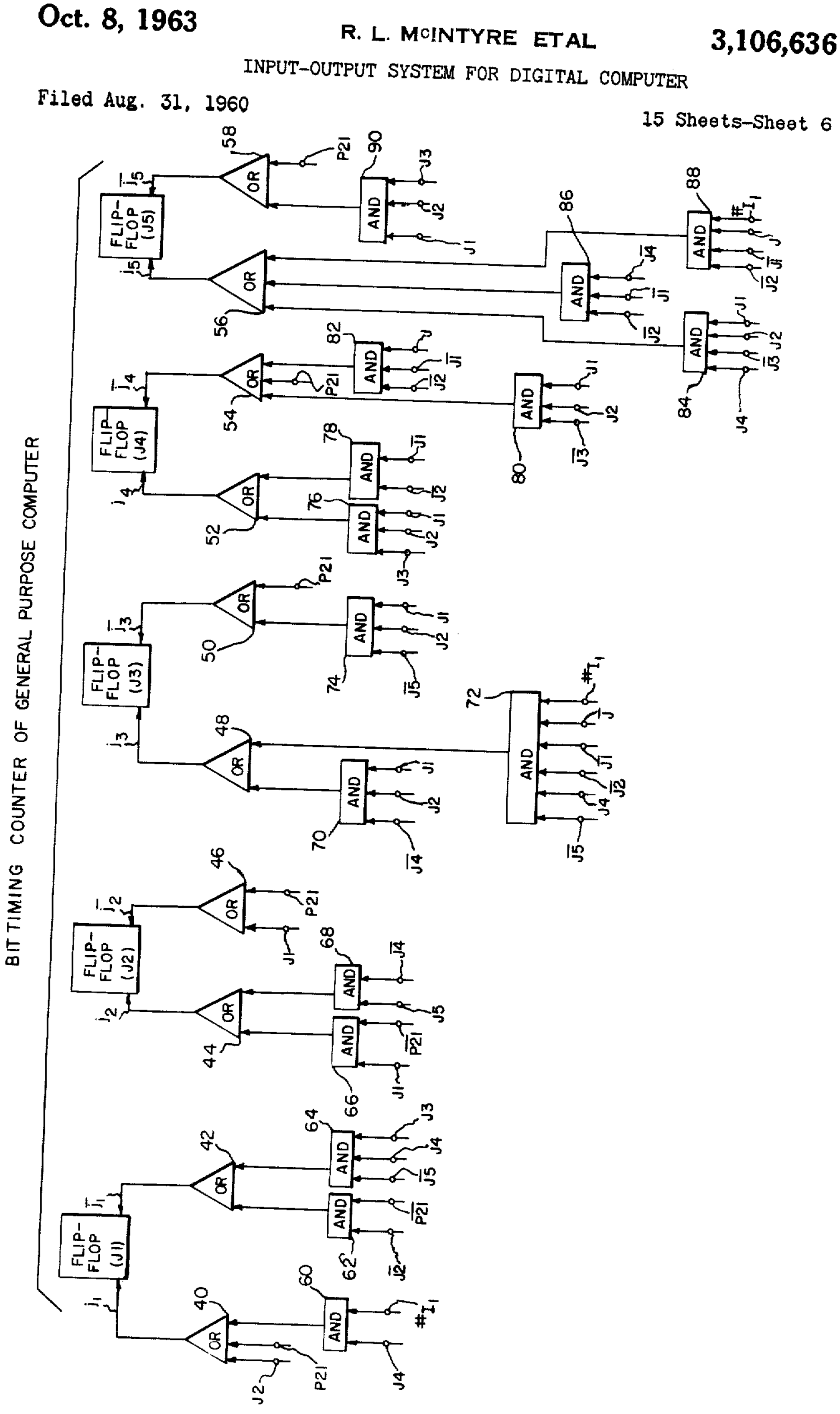
FIGURE 11 is a logic block diagram of a bit timing counter which is used in the general purpose computer to indicate the different bit times in each computer word.

The basic computer word, as shown in FIGURE 7, is made up of 21 information bits and a sign bit. The bit times of the basic computer word are indicated by a series of bit timing pulses (P0–P21) which, in turn, are generated by a basic bit timing counter composed of a plurality of flip-flops J1–J5 (FIGURE 11). The fast accumulator is designed to store eight words, which, as shown in FIGURE 8 are each made up of seven bits, and these words are also timed by the bit timing pulses P0–P21 of the computer. In order that the eight 7-bit words of the fast accumulator may be timed by the P0–P21 bit timing pulses, the counter A4, A5, A6 is also synchronized with the magnetic memory drum of the computer in a manner to be described. The eight 7-bit words from the fast accumulator are produced serially as the output $v_3\#$ at the output of the emitter follower 20 in FIGURE 2. These words have the bit timing illustrated in FIGURE 8, as they form the output $v_3\#$. The successive bits of these words are read by the read amplifier V3 one bit time earlier. Therefore, in order that information from the selected up-down counters *a–h* in FIGURE 6 may be read at the proper times into the circuit of the fast accumulator, illustrated as Section B in FIGURE 2, the flip-flops A4, A5 and A6 are controlled in accordance with the following logic and at the indicated bit times:

$$a_4=P_z$$
$$\overline{a}_4=Pz+S.P17$$
$$a_5=Pz.A4$$
$$\overline{a}_5=Pz.A4+S.P17$$
$$a_6=Pz.A4.A5$$
$$\overline{a}_6=Pz.A4.A5+S.P17$$
$$P_z=P4+P11+P19$$

The term S.P17 causes the flip-flops A4, A5, A6 to be set to 0.0.0 at P17 bit time of each 8th word time of the computer. The term S.P17 is derived from a synchronizing bit A which is recorded in a track on the memory drum of the computer to be described, in conjunction with FIGURE 10. This synchronizing operation occurs when the basic bit timing counter J1–J5 is in synchronism with the memory drum of the computer, and which assures that the counter A4, A5 A6 will count in synchronism with the successive word times of the computer.

The upper line in FIGURE 9 shows successive ones of the 22 bit general computer words, as circulated in the integrator register 10 of FIGURE 1. The lower line in FIGURE 9 shows successive ones of the eight 7-bit words used in the fast accumulator 16 of FIGURE 2. It will be observed that by the recurring pattern of FIGURE 9, each one of the 7-bit fast accumulator words takes its turn in lining up with the least significant digits of successive ones of the computer words in the integrator register.

Therefore, since the words circulated in the integrator register 10 of FIGURE 1 are basic computer words and timed accordingly; the system can be controlled so that at successive word times a different fast accumulator word may be added to the least significant digits of successive words in the integrator register. It will be understood that the alignments of FIGURE 9 repeat themselves after each 8-word times of the computer. Therefore, any particular word from the fast accumulator may be transferred to the integrator every eight word times.

A problem arises, however, in that the 7-bit words of the fast accumulator require a basic computer word of 21 bits in order that the information in the fact accumulator will not precess with respect to the information in the integrator register. However, the basic computer word of the general purpose computer under consideration is 22 bits. By the use of the flip-flop A3 in the circuit of FIGURE 2 and of appropriate logic control circuitry, it is possible to keep the fast accumulator words in step with the basic computer words, as will be described.

As shown in the schematic diagram of FIGURE 2, the output $v_3\#$ is either circulated directly to the write amplifier $v_3$, or it is circulated through the flip-flop (A3). The circulation through the flip-flop (A3) may be controlled so that the fast accumulator words are delayed from time to time by one bit time in order that they can be kept in step with the digits of the basic computer words.

To achieve the circulations described in the preceding paragraph, the write amplifier $v_3$ is made to receive the output $v_3\#$ of FIGURE 2 directly at certain times and to receive that output through the flip-flop (A3) at other duced into the information, for example, in the second times. The control is such that dummy bits are intro- and fifth fast accumulator words in FIGURE 8. These dummy bits appear at P14 bit times as the information emerges from the emitter follower 20 in FIGURE 2. This is a convenient position for the dummy bits in that it permits information to be stored in them, as will be described.

Figure 10:
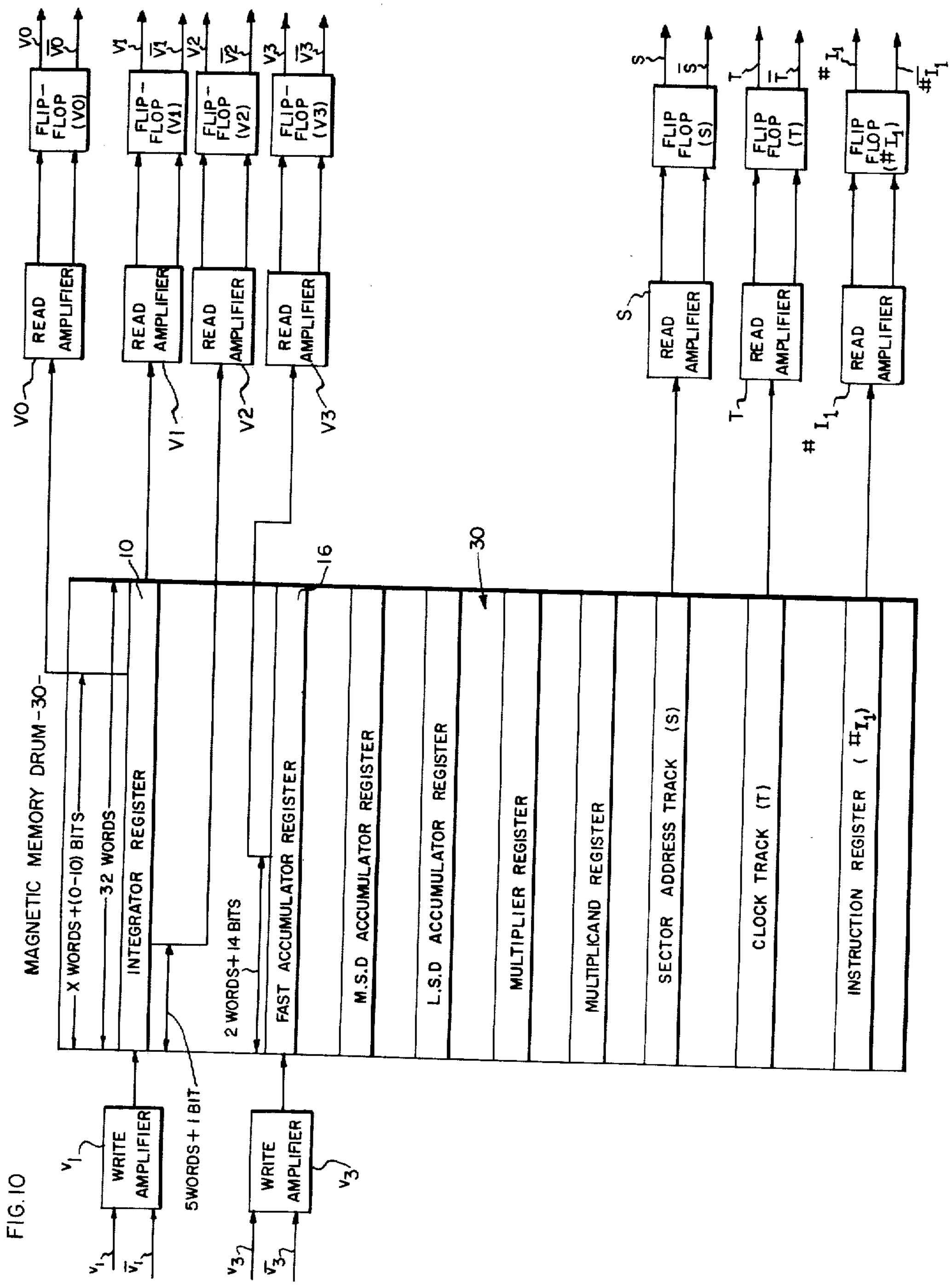
FIGURE 10 is a schematic representation of the magnetic memory drum of the general purpose computer, and this view illustrates particularly the various channels on the drum which are used for storage for the integrator register of FIGURE 1 and for the fast accumulator register of FIGURE 2.

As shown in FIGURE 10, the main computer includes a memory drum 30. The information is stored on the memory drum in a plurality of adjacent channels, and in a plurality of sectors in each channel. The channels for storing such information for the main computer are not shown in FIGURE 10, as such channels have no relevancy to the input-output system of the present invention. The memory drum 30 is also used to provide circulating channels for the different registers used in the computer and for the integrator register 10 of FIGURE 1 and the fast accumulator register 16 of FIGURE 2.

Figure 12:
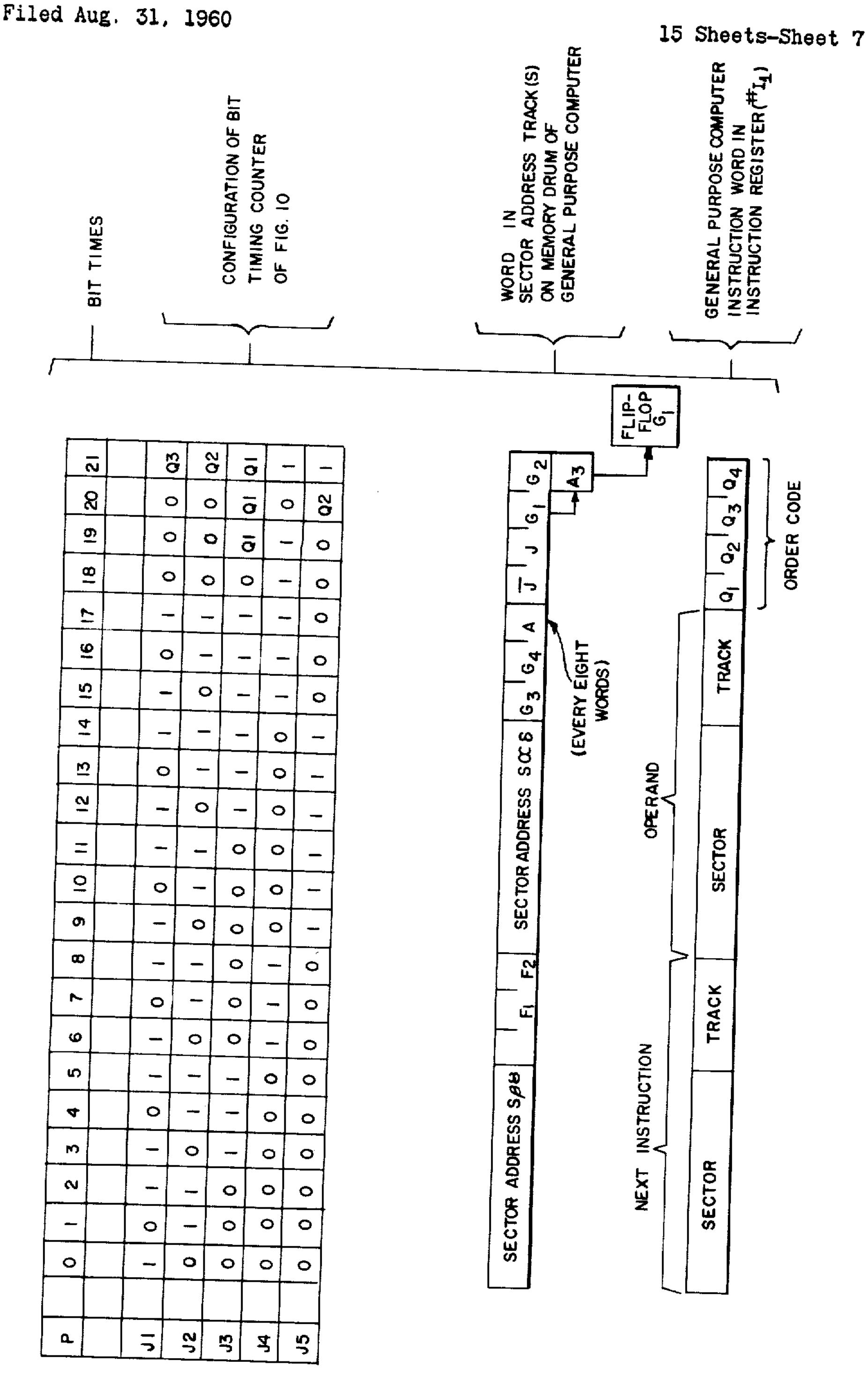
FIGURE 12 is a block diagram including a table illustrating the different configurations of the bit counter of FIGURE 11, and also illustrating the computer words in a sector address track of the memory drum of FIGURE 10 and in an instruction register track of that drum.

For example, and as illustrated, the memory drum 10 provides circulating channels for the most significant digits accumulator register and for the least significant digits accumulator register, and also for the multiplier and multiplicand register of the main computer. A sector address channel (S) and a clock channel (T) are also provided on the memory drum. The memory drum 30 also provides a circulating channel for the instruction register $\#I_1$ of the main computer. The composition of of each word in the sector address track (S) is illustrated in FIGURE 12, and the composition of each word in the instruction register $(\#I_1)$ is also illustrated in FIGURE 12. As noted above, each of the channels illustrated in FIGURE 10 is composed of a plurality of sectors. Each sector, in turn, accommodates one word of information.

As described in more detail in FIGURE 1, the write amplifier $v_1$ is coupled to a write head associated with the integrator register 10. The integrator register has a first read head which is coupled to the read amplifier $V_0$, and the integrator register has a second read head which is coupled to the read amplifier V1. The inputs of the write amplifier $v_1$ are designated $v_1$ and $\bar{v}_1$. The read amplifier $V_0$ is coupled to a flip-flop ($V_0$), and the outputs of that flip-flop are designated $V_0$ and $\overline{V}_0$. The read amplifier V1 is coupled to a flip-flop (V1), and the outputs from the latter flip-flop are designated V1 and $\overline{\mathbf{V1}}$. The read amplifier V2 is coupled to a flip-flop (V2), and the outputs from the flip-flop (V2) are designated V2 and $\overline{\mathbf{V2}}$.

The write amplifier $v_3$ is coupled to a write head associated with the fast accumulator register 16, as described in FIGURE 2, and the fast accumular register has a read head which is coupled to the read amplifier V3. The inputs of the write amplifier $v_3$ are designated $v_3$ and $\bar{v}_3$. The read amplifier V3 is coupled to a flip-flop (V3). The outputs of the flip-flop (V3) are designated V3 and $\overline{\mathrm{V3}}$.

The sector address track (S) has a read head coupled to a read amplifier S. The read amplifier S is coupled to a flip-flop (S). The outputs of the flip-flop (S) are designated S and $\overline{\mathrm{S}}$. The read head of the clock track (T) is coupled to a read amplifier T. The read amplifier T is coupled to a flip-flop (T). The flip-flop (T) produces a pair of clock outputs T and $\overline{\mathrm{T}}$. The instruction register ($\#I_1$) is coupled to a read amplifier $\#I_1$. The read amplifier $\#I_1$ is coupled to a flip-flop ($\#I_1$). The outputs of the flip-flop ($\#I_1$) are designated $\#I_1$ and $\#\overline{I_1}$.

The main computer includes a bit timing counter which, as noted above, is made up of a group of flip-flops J1–J5. This counter is used to indicate the different bit times in each word time of the computer. These bit times, as shown in FIGURE 12, are designated P0–P21. The table in FIGURE 12 indicates the different configurations of the flip-flops J1–J5 in correspondence with the different bit times indicated by the counter.

The logic control circuitry for the bit counter J1–J5 is shown in FIGURE 11. As noted above, the counter is composed of a group of flip-flops J1, J2, J3, J4 and J5. An "or" gate 40 is connected to the true input terminal $J_1$ of the flip-flop (J1), and an "or" gate 42 is connected to the false input terminal $\bar{j}_1$ of that flip-flop. An "or" gate 44 is connected to the true input terminal $j_2$ of the flip-flop (J2), and an "or" gate 46 is connected to the false input terminal $\bar{j}_2$ of that flip-flop. An "or" gate 48 is connected to the false input terminal $j_3$ of the flip-flop (J3), and an "or" gate 50 is connected to the false input terminal $\bar{j}_3$ of that flip-flop. An "or" gate 52 is connected to the true input terminal $j_4$ of the flip-flop (J4), and an "or" gate 54 is connected to the false input terminal of that flip-flop. An "or" gate 56 is connected to the true input terminal $j_5$ of the flip-flop (J5), and an "or" gate 58 is connected to the false input terminal of that flip-flop.

The terms J2 and P21 are introduced to the "or" gate 40, and an "and" gate 60 is connected to that "or" gate. The terms $\overline{J4}$ and $\#I_1$ are introduced to the "and" gate 60. A pair of "and" gates 62 and 64 are connected to he "or" gate 42. The terms $\overline{J2}$ and $\overline{P21}$ are introduced o the "and" gate 62. The terms $\overline{J5}$, J4 and J3 are introluced to the "and" gate 64.

A pair of "and" gates 66 and 68 are connected to he "or" gate 44. The terms J1 and $\overline{P21}$ are introduced o the "and" gate 66. The terms $\overline{J4}$ and J5 are introuced to the "and" gate 68. The terms J1 and P21 are ntroduced to the "or" gate 46.

An "and" gate 70 and an "and" gate 72 are connected the "or" gate 48. The terms $\overline{J4}$, J2 and J1 are introuced to the "and" gate 70. The terms $\overline{J5}$, J4, $\overline{J2}$, $\overline{J1}$, $\overline{J}$ and $\#I_1$ are introduced to the "and" gate 72. An "and" gate 74 is connected to the "or" gate 50, and the term P21 is introduced to that "or" gate. The terms $\overline{J5}$, J2 and J1 are applied to the "and" gate 74.

A pair of "and" gates 76 and 78 is connected to the "or" gate 52. The terms J3, J2 and J1 are introduced to the "and" gate 76. The terms $\overline{J2}$ and $\overline{J1}$ are introduced to the "and" gate 78. The term P21 is introduced to the "or" gate 54, and a pair of "and" gates 80 and 82 is connected to that "or" gate. The terms $\overline{J3}$, J2 and J1 are introduced to the "and" gate 80. The terms $\overline{J2}$, $\overline{J1}$ and J are introduced to the "and" gate 82.

A plurality of "and" gates 84, 86 and 88 is connected to the "or" gate 56. The terms J4, $\overline{J3}$, J2 and J1 are introduced to the "and" gate 84. The terms $\overline{J2}$, $\overline{J1}$ and $\overline{J4}$ are introduced to the "and" gate 86. The terms $\overline{J2}$, $\overline{J1}$, J and $\#I_1$ are introduced to the "and" gate 88. An "and" gate 90 is connected to the "or" gate 58 and the term P21 is introduced to that "or" gate. The terms J1, J2 and J3 are introduced to the "and" gate 90.

The bit counter J1–J5 of FIGURE 11 is synchronized by a pair of bits $\overline{J}$ and J which are recorded in each sector of the sector address track (S) of the memory drum (FIGURE 10) at the P18 and P19 digit positions, respectively, as shown in FIGURE 12. The logic equations for the bit counter J1–J5 are as follows:

$$j_1=J2+P21+\overline{J4}.\#I_1$$
$$\bar{j}_1=\overline{J2}.\overline{P21}+\overline{J5}.J4.J3$$
$$j_2=J1.\overline{P21}+J5.\overline{J4}$$
$$\bar{j}_2=J1+P21$$
$$\bar{j}_3=\overline{J4}.J2.J1+\overline{J5}.J4.\overline{J2}.\overline{J1}.\overline{J}.\#I_1$$
$$j_3=\overline{J5}.J2.J1+P21$$
$$j_4=J3.J2.J1+\overline{J2}.\overline{J1}$$
$$\bar{j}_4=\overline{J3}.J2.J1+\overline{J2}.\overline{J1}.J+P21$$
$$j_5=J4.\overline{J3}.J2.J1+\overline{J2}.\overline{J1}.J\#I_1+\overline{J2}.\overline{J1}.\overline{J4}$$
$$\bar{j}_5=J3.J2.J1+P21$$
$$J4.J5=P21$$
$$\overline{J4}+\overline{J5}=\overline{P21}$$

In synchronizing the bit counter J1–J5 with the memory drum 30 of FIGURE 10, the counter is stepped in normal manner until it reaches the P18 configuration $\overline{J1}.\overline{J2}.\overline{J3}.J4.\overline{J5}$. This stepping is under the control of the clock flip-flop (T) in FIGURE 10, which flip-flop responds to the clock pulses from the clock track T on the memory drum 30. The clock term T is omitted from the illustrated logic circuitry and from the logic equations to be set out herein to simplify the circuitry and equations. The counter remains in the P18 configuration until it lines up with the P18 bit position on the memory drum 30 (FIGURE 10). Then, the J bit at the P18 bit position of the (S) track provides the P19 configuration, and the counter can be stepped to the P20 configuration. It will be appreciated that insofar as the flip-flops (J1–J5) are concerned, there is no difference between the P18 and P19 configuration, and the $\overline{\mathrm{J}}$ and J bits in the S track effectively provide an additional flip-flop in the bit counter.

It will be noted that the P19 bit time is designated by the configuration $\overline{J1}.\overline{J2}.X.J4.\overline{J5}.J$ of the bit counter; that the P20 bit time is designated by the $\overline{J1}.\overline{J2}.x.\overline{J4}.x$; and that the P21 bit time is designated by the configuration $x.x.x.J4.J5$. The unused (J) flip-flops during the P19, P20 and P21 bit times are used as a temporary storage for the order code bits of the instruction word in the instruction register $\#I_1$ of FIGURE 10. As illustrated in the lower block of FIGURE 12, each instruction word stored in the instruction register $\#I_1$ of FIGURE 10 includes information designating the sector (P0–P5) and track (*P6.P8*) location of the next instruction, information designating the sector (P9–P14) and track (P15–P17) location of the operand to be acted upon by the particular instruction, and information (P18–P21) designating the particular operation to be carried out by that instruction. The latter information is designated by the digits Q1, Q2, Q3 and Q4, and these digits appear in each instruction in accordance with a pre-determined order code to designate the different operations to be carried out by the main computer.

As indicated by the upper block in FIGURE 12, the Q1 digit is stored in the flip-flop (J3) at P19 bit time, and it is held in that flip-flop till P21 bit time. Likewise, the Q2 digit is stored in the flip-flop (J5) at P20 bit time and is transferred to the flip-flop (J2) at P21 bit time. Also, the Q3 digit is stored in the flip-flop (J1) at P21 bit time. This enables the Q1–Q4 digits to be simultaneously transferred to the corresponding flip-flops of the order register of the main computer at P21 bit time, and so that the flip-flops of the order register may be set at P0 bit time to a configuration corresponding to the order to be carried out by the corresponding instruction. It should be noted that the flip-flops (J1) (J2) and (J3) are set in accordance with the respective Q1, Q2 and Q3 bits at the end of each word time. However, the information is transferred to the order register of the main computer only when the execution of the preceding instruction has been completed.

The information stored in each sector of the sector address track (S) (FIGURE 10) of the memory drum 30 is shown in the middle block of FIGURE 12. Each sector includes information representing the address of that sector (P0–P5) ($S_{\beta}$, $\gamma$) and (P9–P14) ($S_{\alpha}$, $\gamma$) for comparison with the sector address portions of the instruction word in the instruction register (#$I_1$), as represented by the lower block in FIGURE 12. The sector address at the (P0–P5) bit positions in the (S) track is the same as the sector address in the (P9–P14) bit positions, but these addresses vary from sector to sector around the sector address track (S).

The bit positions P7 and P8 of each sector of the sector address track (S) are used to hold time standard control bits F1 and F2. These bits, as will be described in detail subsequently, control respective ones of the flip-flops F1 and F2 in FIGURE 1. A synchronizing bit A is recorded at the P17 bit position in selected sectors in the track (S) for synchronizing the A4–A6 counter, as described above. The synchronizing bit may be recorded at the P17 bit position of each 8th word in the track (S), as indicated in FIGURE 12. However, this synchronizing bit may be recorded in one sector only of the track (S) so as to occur once for each revolution of the memory drum. This latter recording has been found to provide adequate synchronizing of the A4–A6 counter, and it has been found to simplify the equipment required to test the system.

The $\overline{J}$ and J bits are recorded in each sector of the sector address track (S), as shown in the middle block of FIGURE 12, and as described above. These latter bits, as noted, are used to synchronize the bit counter J1–J5. The bits $\overline{J}$ and J also effectively add a flip-flop to the bit counter, as mentioned above.

The P20 and P21 bit positions of each sector in the sector address track (S) are used to store code control bits G1 and G2 for the input-output system of the invention. These code control bits are used to control respective ones of the flip-flops G1 and G2 in FIGURE 1. The flip-flop A3 is used as a temporary storage for the bit G1 so that the flip-flops G1 and G2 may be set simultaneously at P21 bit time. The P15 and P16 bit positions in each sector of the track (S) are used respectively to store additional selection bits G3 and G4. These latter bits control respective ones of the output selection flip-flops (G3) and (G4) of FIGURE 1, as will be described in detail subsequently.

To reiterate the two 6-bit sections in the middle block (sector address track S) of FIGURE 12, labelled $S\beta\gamma$ and $S\alpha\delta$ are sector address numbers which are used by the general purpose computer to identify sectors of the memory drum 30 of FIGURE 10, and these numbers are not used by the input-output system of the invention. The bits F1 and F2 in the sector address track S are used to synchronize the memory drum with an external accurate time standard signal. The bit labelled A in the sector address track is used to synchronize the fast accumulator input selector flip-flops (A4–A6). As noted, this latter bit is a "one" every eighth word, and it is a "zero" otherwise. The bits labelled $\overline{J}$ and J always contain a "0" and a "1" respectively, and they serve to place the bit counter (J1–J5) in step with the memory drum 30 during the initial drum rotations at the start of the computer operation. These latter bits are also used in the logic of the flip-flops J1–J5 and in the logic of the flip-flops A4–A6. The bits labelled G1–G4 control similarly labelled flip-flops in the integrator register logic, as will be described.

Figure 13:
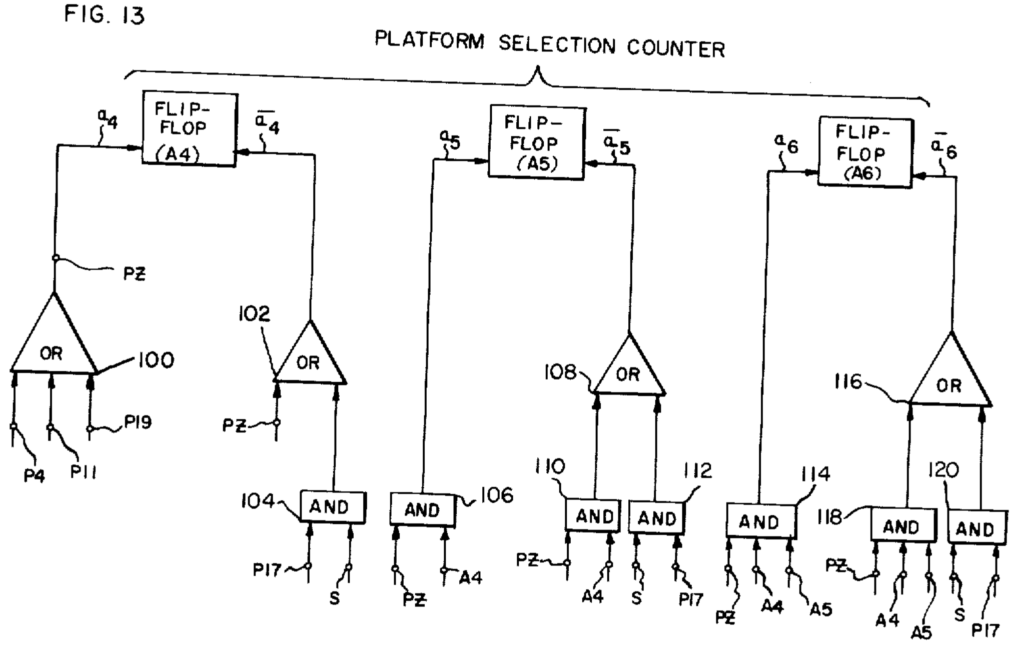
FIGURE 13 is a logic block diagram illustrating the selection system of FIGURE 3.

The logic control system associated with the platform selection counter A4, A5 and A6 of FIGURE 2 is shown in FIGURE 13. This counter includes the flip-flops A4, A5 and A6.

An "or" gate 100 is connected to the true input terminal $a_4$ of the flip-flop (A4), and an "or" gate 102 is connected to the false input terminal $\overline{a}_4$ of that flip-flop. The "or" gate 100 produces the term PZ. The terms P4, P11 and P19 are introduced to the "or" gate 100. The term PZ is introduced to the "or" gate 102, and an "and" gate 104 is also connected to that "or" gate. The terms P17 and S are introduced to the "and" gate 104.

An "and" gate 106 is connected to the true input terminal $a_5$ of the flip-flop (A5), and an "or" gate 108 is connected to the false input terminal $\overline{a}_5$ of that flip-flop. A pair of "and" gates 110 and 112 is connected to the "or" gate 108. The terms PZ and A4 are introduced to the "and" gates 106 and 110, and the terms S and P17 are introduced to the "and" gate 112.

An "and" gate 114 is connected to the true input terminal $a_6$ of the flip-flop (A6), and an "or" gate 116 is connected to the false input terminal $\overline{a}_6$ of that flip-flop. The terms PZ, A4 and A5 are introduced to the "and" gate 114. A pair of "and" gates 118 and 120 are connected to the "or" gate 116. The terms PZ, A4 and A5 are introduced to the "and" gate 118. The terms S and P17 are introduced to the "and" gate 120.

Figure 14:
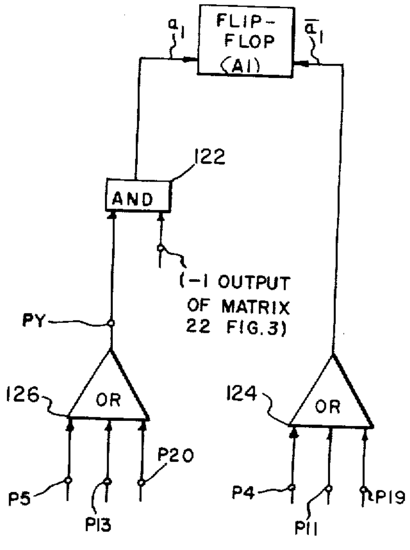
FIGURE 14 illustrates the logic associated with a negative increment flip-flop included in the circuitry of FIGURE 2.

The negative increment flip-flop (A1) of FIGURE 2 is shown with its associated logic control system in FIGURE 14. An "and" gate 122 is connected to the true input terminal $a_1$ of the flip-flop A1, and an "or" gate 124 is connected to the false input terminal $\overline{a}_1$ of that flip-flop. An "or" gate 126 produces the term PY, and that term is introduced to the "and" gate 122. The "−1" output of the matrix 22 in FIGURE 3 is also introduced to the "and" gate 122. The terms P5, P13 and P20 are introduced to the "or" gate 126. Likewise, the digit timing terms P4, P11 and P19 are introduced to the "or" gate 124.

Figure 15:
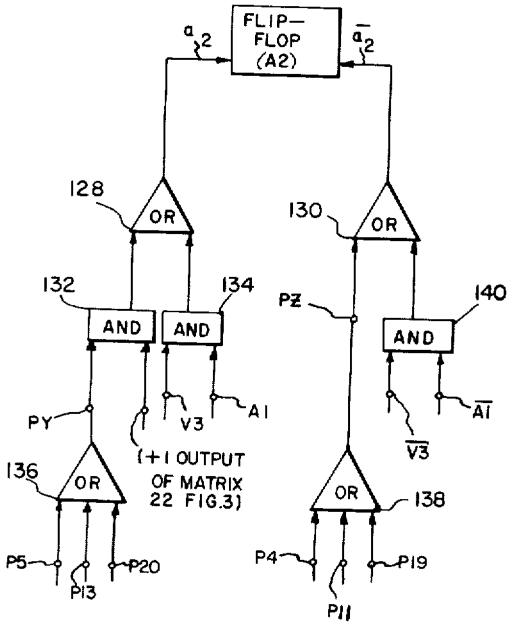
FIGURE 15 illustrates the logic associated with a positive increment flip-flop associated with the circuitry of FIGURE 2.

The positive increment flip-flop (A2) is shown with its associated logic control system in FIGURE 15. This latter flip-flop also acts as a normal carry flip-flop. An "or" gate 128 is connected to the true input terminal $a_2$ of the flip-flop (A2), and an "or" gate 130 is connected to the false input terminal $\overline{a}_2$ of that flip-flop. A pair of "and" gates 132 and 134 are connected to the "or" gate 128. An "or" gate 136 produces the term PY which is introduced to the "and" gate 132. The "+1" output of the matrix 22 of FIGURE 3 is also introduced to the "and" gate 132. The digit timing terms P5, P13 and P20 are introduced to the "or" gate 136. The terms V3 and A1 are introduced to the "and" gate 134. An "or" gate 138 produces the term PZ which is introduced to the "or" gate 130. An "and" gate 140 is also connected to the "or" gate 130. The terms $\overline{V3}$ and $\overline{A1}$ are introduced to the "and" gate 140.

Figure 16:
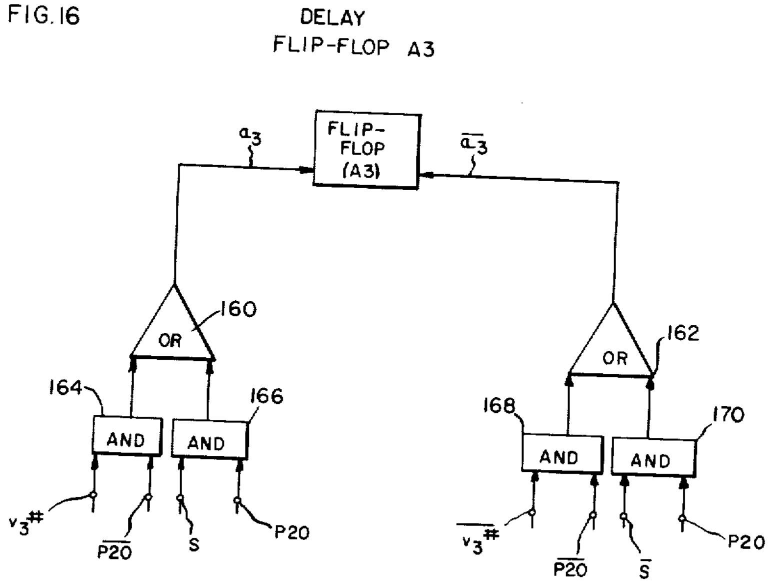
FIGURE 16 is a logic block diagram of a further flip-flop in the circuitry of FIGURE 2.

The delay flip-flop (A3) and its associated logic control system is illustrated in FIGURE 16. An "or" gate 160 is connected to the true input terminal $a_3$ of the flip-flop A3, and an "or" gate 162 is connected to the false input terminal $\overline{a}_3$ of that flip-flop. A pair of "and" gates 164 and 166 is connected to the "or" gate 160, and a pair of "and" gates 168 and 170 is connected to the "or" gate 162. The term $v_3{}^{\#}$ and the term $\overline{P20}$ are introduced to the "and" gate 164. The terms S and P20 are introduced to the "and" gate 166. The terms $\overline{v}_3{}^{\#}$ and $\overline{P20}$ are introduced to the "and" gate 168, and the terms $\overline{S}$ and P20 are introduced to the "and" gate 170.

Figure 17:
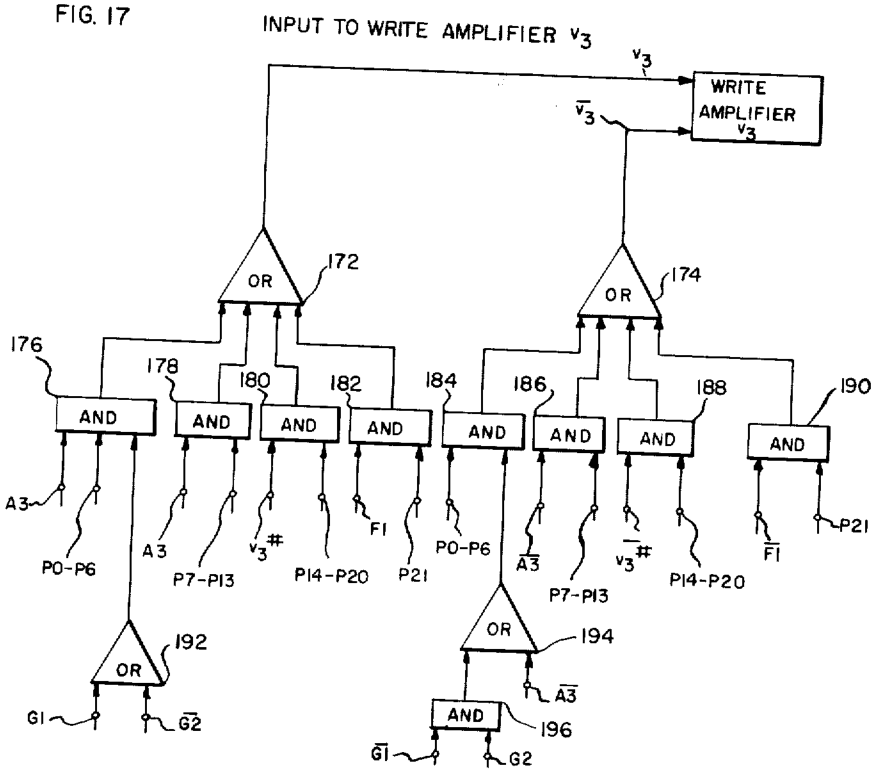
FIGURE 17 is a block diagram illustrative of the logic associated with a write amplifier in the circuitry of FIGURE 2.

The logic associated with the write amplifier $v_3$ of FIGURE 2 is set out in FIGURE 17. An "or" gate 172 is connected to the input terminal $v_3$ of the write amplifier, and an "or" gate 174 is connected to the input terminal $\overline{v}_3$ of the write amplifier. A plurality of "and" gates 176, 178, 180 and 182 is connected to the "or" gate 172. A plurality of "and" gates 184, 186, 188 and 190 is connected to the "or" gate 174.

The terms A3 and P0–P6 are introduced to the "and" gate 176. An "or" gate 192 is also connected to the "and" gate 176, and the terms G1 and $\overline{G2}$ are introduced to that "or" gate. The terms A3 and P7–P13 are introduced to the "and" gate 178. The terms $v_3{}^{\#}$ and P14–P20 are introduced to the "and" gate 180. The terms F1 and P21 are introduced to the "and" gate 182.

An "or" gate 194 is connected to the "and" gate 184. The terms P0–P6 are also introduced to that "and" gate. An "and" gate 196 is connected to the "or" gate 194. The terms $\overline{G1}$ and G2 are introduced to the "and" gate 196. The term $\overline{A3}$ is introduced to the "or" gate 194. The terms $\overline{A3}$ and P7–P13 are introduced to the "and" gate 186. The terms $v_3{}^{\#}$ and P14–P20 are introduced to the "and" gate 188. The terms $\overline{F1}$ and P21 are introduced to the "and" gate 190.

The control and selection flip-flops G1, G2, G3 and G4 of FIGURE 1 are controlled, as mentioned in the description of FIGURE 12, by the corresponding G1, G2, G3 and G4 bits in the sector address channel (S). The input operations are under the control of the flip-flops (G1) and (G2), and the output and integration operations are controlled by the flip-flops (G1), (G2), (G3) and (G4). The various control operations are set out in the table of FIGURE 18.

Figures 18, 19:
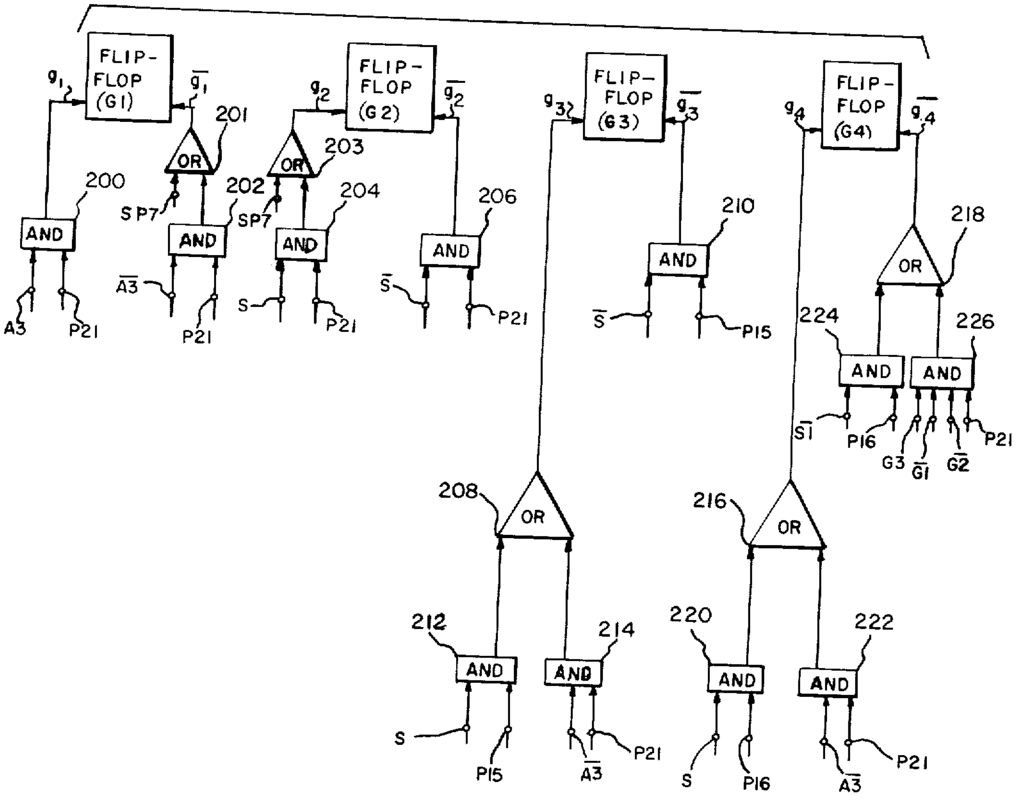
FIGURE 18 is a table illustrating the different operations of which the input-output system of the invention is capable of carrying out.
FIGURE 19 is a block diagram of a group of control and selection flip-flops in the circuitry of FIGURE 1 and the logic associated with those flip-flops.

The logic control system associated with the flip-flops (G1), (G2), (G3) and (G4) is set out in FIGURE 19. An "and" gate 200 is connected to the true input terminal $g_1$ of the flip-flop G1, and an "or" gate 201 is connected to the false input terminal $\overline{g}_1$ of that flip-flop. The term SP7 is introduced to the "or" gate 201, and an "and" gate 202 is also connected to the "or" gate. The terms A3 and P21 are introduced to the "and" gate 200, and the terms $\overline{A3}$ and P21 are introduced to the "and" gate 202.

An "or" gate 203 is connected to the true input terminal $g_2$ of the flip-flop G2, and an "and" gate 206 is connected to the false input terminal $\overline{g}_2$ of that flip-flop. The term SP7 is introduced to the "or" gate 203, and an "and" gate 204 is connected to that "or" gate. The terms S and P21 are introduced to the "and" gate 204, and the terms $\overline{S}$ and P21 are introduced to the "and" gate 206.

An "or" gate 208 is connected to the true input terminal $g_3$ of the flip-flop (G3), and an "and" gate 210 is connected to the false input terminal $\overline{g}_3$ of that flip-flop. An "and" gate 212 and an "and" gate 214 are connected to the "or" gate 208. The terms S and P15 are introduced to the "and" gate 212, and the terms $\overline{S}$ and P15 are introduced to the "and" gate 210. These terms control the normal transfer of the control code to the flip-flop (G3). The terms $\overline{A3}$ and P21 are introduced to the "and" gate 214. These terms set the flip-flop (G3) high to designate the first word of an integration.

An "or" gate 216 is connected to the true input terminal $g_4$ of the flip-flop (G4), and an "or" gate 218 is connected to the false input terminal $\overline{g}_4$ of that flip-flop. A pair of "and" gates 220 and 222 is connected to the "or" gate 216, and a pair of "and" gates 224 and 226 is connected to the "or" gate 218. The terms S and P16 are introduced to the "and" gate 220, and the terms $\overline{S}$ and P16 are introduced to the "and" gate 224. These terms effectuate the normal transfer of the control code to the flip-flop (G4). The terms $\overline{A3}$ and P21 are introduced to the "and" gate 222. These terms set the flip-flop (G4) high to designate the first word of an integration. The terms G3, $\overline{G1}$, $\overline{G2}$ and P21 are introduced to the "and" gate 226. These terms set the flip-flop G4 low to indicate that the next bit starts the second word integration, as will be explained in more detail subsequently.

Figure 20:
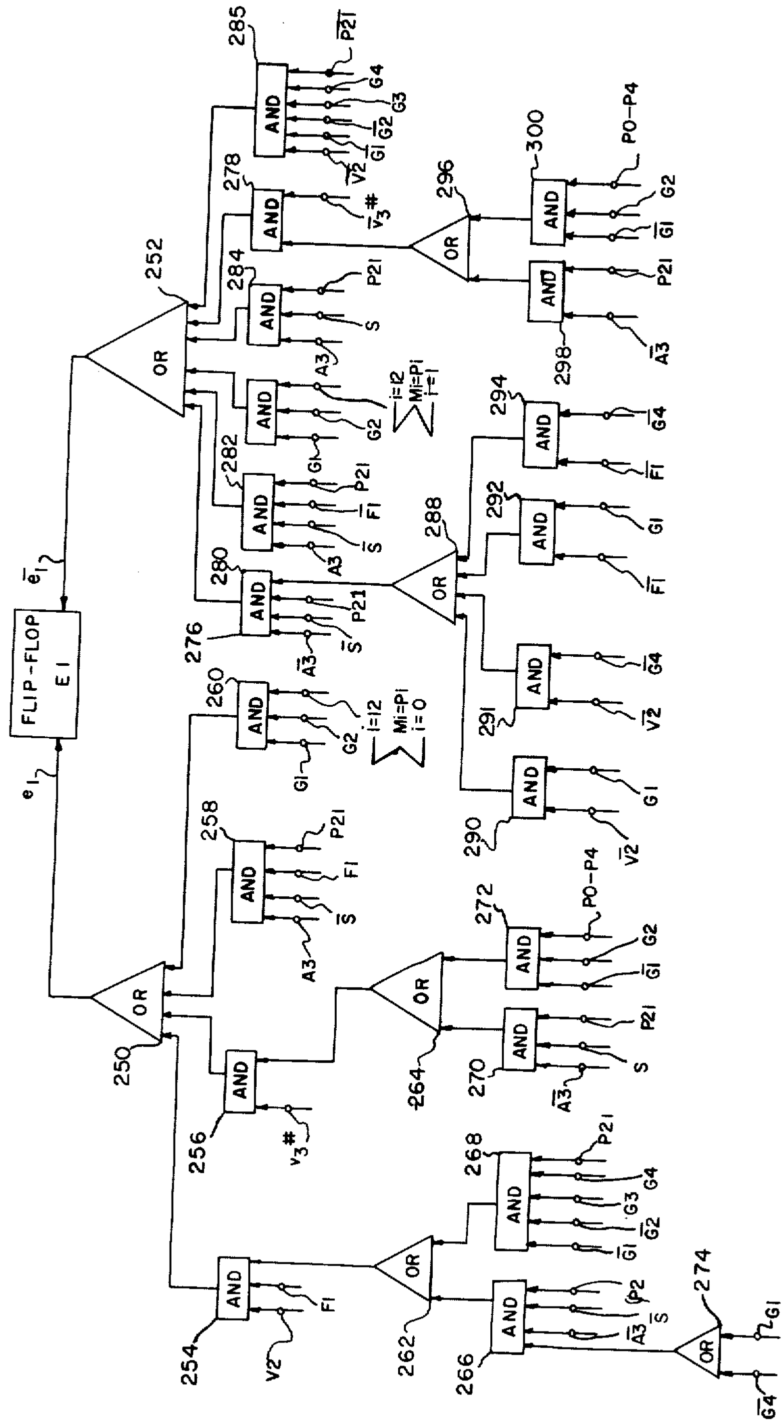
FIGURE 20 is a logic block diagram of an input flip-flop which is used in conjunction with an adder included in the circuitry of FIGURE 1.

As noted above, the adder 12 of the integrator section of FIGURE 1 includes an input flip-flop (E1). The logic associated with that flip-flop is shown in FIGURE 20. An "or" gate 250 is connected to the true input terminal $e_1$ of the flip-flop (E1), and an "or" gate 252 is connected to the false input terminal $\overline{e}_1$ of the flip-flop.

A plurality of "and" gates 254, 256, 258 and 260 is connected to the "or" gate 250. The terms V2 and F1 are introduced to the "and" gate 254, and an "or" gate 262 is connected to the "and" gate. The term $v_3{}^{\#}$ is introduced to the "and" gate 256, and an "or" gate 264 is connected to the "and" gate. The terms A3, $\overline{S}$, F1 and P21 are introduced to the "and" gate 258. The terms G1, G2 and $$\sum_{i=0}^{i=12} Mi.Pi$$

are introduced to the "and" gate 260.

An "and" gate 266 and an "and" gate 268 are connected to the "or" gate 262. An "and" gate 270 and an "and" gate 272 are connected to the "or" gate 264. An "or" gate 274 is connected to the "and" gate 266. The terms $\overline{A3}.S$ and P21 are introduced to the "and" gate 266. The terms G1 and $\overline{G4}$ are introduced to the "or" gate 274. The terms $\overline{G1}$, $\overline{G2}$, G3, G4 and $\overline{P21}$ are introduced to the "and" gate 268. The terms $\overline{A3}$, S and P21 are introduced to the "and" gate 270. The terms $\overline{G1}$, G2 and P0–P4 are introduced to the "and" gate 272.

A plurality of "and" gates 276, 278, 280, 282, 284 and 285 is connected to the "or" gate 252. An "or" gate 288 is connected to the "and" gate 276. The terms $\overline{A3}$, $\overline{S}$, P21 are introduced to the "and" gate 276. A plurality of "and" gates 290, 291, 292 and 294 are connected to the "or" gate 288. The terms $\overline{V2}$ and and G1 are introduced to the "and" gate 290, the terms $\overline{V2}$ and $\overline{G4}$ are introduced to the "and" gate 291, the terms $\overline{F1}$ and G1 are introduced to the "and" gate 292, and the terms $\overline{F1}$ and $\overline{G1}$ are introduced to the "and" gate 294.

The term $\overline{v}_3{}^{\#}$ is introduced to the "and" gate 278, and an "or" gate 296 is connected to the "and" gate. A pair of "and" gates 298 and 300 is connected to the "or" gate 296. The terms $\overline{A3}$, S and P21 are introduced to the "and" gate 298. The terms $\overline{G1}$, G2 and P0–P4 are introduced to the "and" gate 300. The terms A3, $\overline{S}$, $\overline{F1}$ and P21 are introduced to the "and" gate 280. The terms G1, G2 and $$\sum_{i=1}^{i=11} Mi.Pi$$

are introduced to the "and" gate 282. The terms A3, S and P21 are introduced to the "and" gate 284. The terms $\overline{V2}$, $\overline{G1}$, $\overline{G2}$, G3, G4 and $\overline{P21}$ are introduced to the "and" gate 285.

The logic control system of FIGURE 20 associated with the input flip-flop E1 of the adder 12 of FIGURE 1 may be represented by the following logic equations:

$$e_1=V2.F1[\overline{A3}.\overline{S}(\overline{G4}+G1)P21+\overline{G1}.\overline{G2}.G3.G4.\overline{P21}] +v_{3}\# [\overline{A3}.S.P21+\overline{G1}.G2(P0-P4)] +A3.\overline{S}.F1.P21+G1.G2\sum_{i=0}^{i=12}$$

$$\overline{e}_1=\overline{A3}.\overline{S}.P21(\overline{V2}.G1+\overline{V2}.\overline{G4}+\overline{F}1.G1+\overline{F}1.\overline{G4}) +\overline{V2}.\overline{G1}.\overline{G2}.G3.G4.\overline{P21}+ \#\overline{V3}(\overline{A3}.S.P21 +\overline{G1}.G2.P0-P4)+A3.\overline{S}.\overline{F1}.P21+A3.S.P21 +G1\text{-}G2(\#M1.P1*M12.P12)$$

Figure 21:
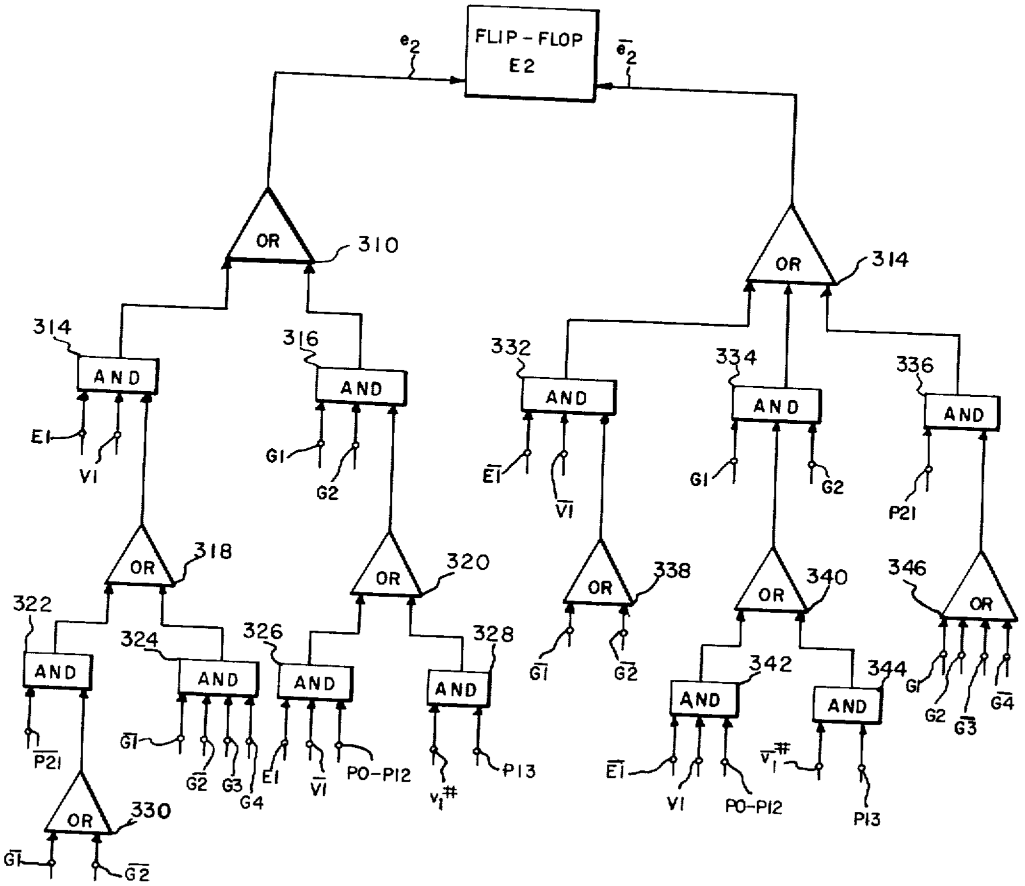
FIGURE 21 is a logic block diagram of a carry flip-flop associated with the adder of FIGURE 1 and of the control components associated with that flip-flop.

The adder 12 of the integrator section of FIGURE 1 also includes the carry flip-flop (E2), as noted above. The logic associated with the carry flip-flop (E2) is shown in FIGURE 21. An "or" gate 310 is connected to the true input terminal $e_2$ of the flip-flop E2 and an "or" gate 213 is connected to the false input terminal $\overline{e}_2$ of the flip-flop.

A pair of "and" gates 314 and 316 is connected to the "or" gate 310. An "or" gate 318 is connected to the "and" gate 314, and an "or" gate 320 is connected to the "and" gate 316. The terms E1 and V1 are introduced to the "and" gate 314. and the terms G1 and G2 are introduced to the "and" gate 316.

A pair of "and" gates 322 and 324 is connected to the "or" gate 318 and a pair of "and" gates 326 and 328 is connected to the "or" gate 320. An "or" gate 330 is connected to the "and" gate 322. The terms $\overline{G1}$ and $\overline{G2}$ are introduced to the "or" gate 330. The term $\overline{P21}$ is introduced to the "and" gate 322. The terms $\overline{G1}$, $\overline{G2}$, G3 and G4 are introduced to the "and" gate 324. The terms E1, $\overline{V1}$ and P0–P12 are introduced to the "and" gate 326. The terms $v_1$ and P13 are introduced to the "and" gate 328.

A plurality of "and" gates 332, 334 and 336 is connected to the "or" gate 312. The terms $\overline{E1}$ and $\overline{V1}$ are introduced to the "and" gate 332. The terms G1 and G2 are introduced to the "and" gate 334. The term P21 is introduced to the "and" gate 336.

An "or" gate 338 is connected to the "and" gate 332, and the terms $\overline{G1}$ and $\overline{G2}$ are introduced to that "or" gate. An "or" gate 340 is connected to the "and" gate 334, and a pair of "and" gates 342 and 344 is connected to that "or" gate. The terms $\overline{E1}$, V1 and P0–P12 are introduced to the "and" gate 342. The term $\overline{v_1}^{\#}$ and the term P13 are introduced to the "and" gate 344. An "or" gate 346 is connected to the "and" gate 336. The terms G1, G2, $\overline{G3}$ and $\overline{G4}$ are introduced to the "or" gate 346.

The logic system of FIGURE 21 may be represented by the following logic equations:

$$e_2=E1.V1[(\overline{G1}+\overline{G2})\overline{P21}+\overline{G1}.\overline{G2}.G3.G4)] +G1.G2[E1.\overline{V1}(P0\text{–}P12)+\overline{v_1}^{\#}.P13]$$

$$\overline{e}_2=\overline{E1}.\overline{V1}(\overline{G1}+\overline{G2})+G1.G2[\overline{E1}.V1(P0\text{–}P12) +v_1^{\#}.P13]+(G1+G2+\overline{G3}+\overline{G4})P21$$

Figure 22:
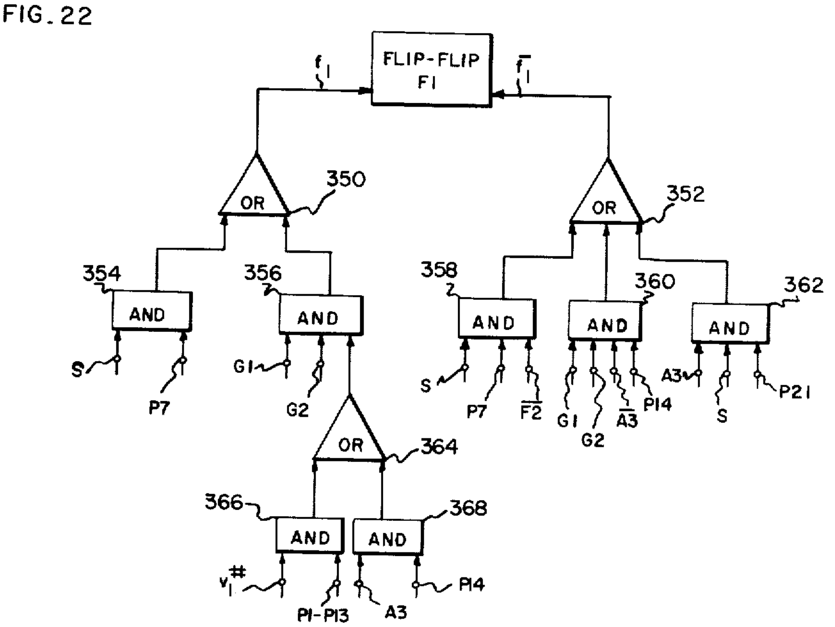

The logic associated with the time standard flip-flop (F1) of FIGURE 1 is shown in FIGURE 22. An "or" gate 350 is connected to the true input terminal $f_1$ of the flip-flop F1, and an "or" gate 352 is connected to the false input terminal $\overline{f}_1$ of that flip-flop.

A pair of "and" gates 354 and 356 is connected to the "or" gate 350. A plurality of "and" gates 358, 360 and 362 is connected to the "or" gate 352. The terms S and P7 are introduced to the "and" gate 354. The terms G1 and G2 are introduced to the "and" gate 356, and an "or" gate 364 is also connected to that "and" gate. A pair of "and" gates 366 and 368 is connected to the "or" gate 364. The terms $v_1\#$ and P1–P13 are introduced to the "and" gate 366. The terms A3 and P14 are introduced to the "and" gate 368.

The terms S, P7 and $\overline{F2}$ are introduced to the "and" gate 358. The terms G1, G2, $\overline{A3}$ and P14 are introduced to the "and" gate 360. The terms A3, S and P21 are introduced to the "and" gate 362.

Figure 23:
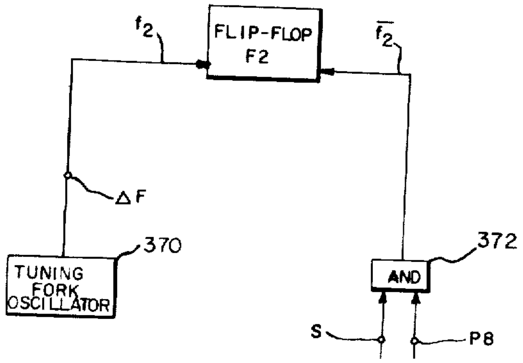
FIGURES 22 and 23 represent a pair of time standard flip-flops and the logic control systems respectively associated with those flip-flops.

The logic associated with the time flip-flop (F2) is shown in FIGURE 23. The time standard pulses $\Delta F$ are introduced to the true input terminal $f2$ of the flip-flop (F2) from any suitable precision frequency source, such as a tuning fork oscillator 370. An "and" gate 372 is connected to the false input terminal $\overline{f2}$ of that flip-flop. The terms S and P8 are introduced to the "and" gate 372.

The logic associated with the flip-flop (F1) in FIGURE 22 may be represented by the following equations:

$$f_1=S.P7+G1.G2[v_1{}^{\#}(P1\text{–}P13)+A3.P14]$$
$$\overline{f}_1=S.P7.\overline{F2}+G1.G2(\overline{A3}.P14)+A3.S.P21$$

The logic associated with the time flip-flop (F2) of FIGURE 23 may be represented by the following logic equations:

$$f_2=\Delta F$$
$$\overline{f}_2=S.P8$$

The integrator section of the input-output system, as shown in FIGURE 2, and as described above, is capable of generating of integration, of processing input velocities, of generating time signals, and indications of real time, and of generating output signals which are used to servo analogue-to-digital output converters. The manner in which the integrator section performs these functions will now be described.

During an input operation the accumulated increments in the fast accumulator 16 of FIGURE 2 of a selected one of the velocity terms from the inertial platform are added with the least significant digits of the corresponding term in the integrator register 10 of FIGURE 1. As shown in FIGURE 9, and as described above, different ones of the 7-bit fast accumulator words line up with the least significant digit positions of successive ones of the words in the integrator register at successive word times. Under the control of the flip-flops (G1) and (G2), which in turn are controlled by the G1 and G2 bits programmed into the S-track of the memory drum 30 of FIGURE 10, the accumulated increments of the different terms in the fast accumulator are added to the corresponding terms in the integrator register 10.

The input operation does not use the flip-flops (G3) and (G4), and this operation is indicated by the setting of the flip-flop (G1) to its false state and the setting of the flip-flop (G2) to its true state. These flip-flops are controlled, as described above, by the bits G1 and G2 read from the sector address track S at P20 and P21 bit times respectively. The flip-flops (G1) and (G2) are set by these bits prior to the corresponding input word time during which a selected word in the fast accumulator 16 of FIGURE 2 is added to its integrand in the integrator register 10 of FIGURE 1, as represented schematically in FIGURE 24. A particular fast accumulator word lines up with its integrand in the integrator register 10 every eight word times in the manner described above, and one of these eight word times for each 32-word interval (half revolution of the memory drum) is usually selected as the time during which the corresponding input operation is carried out.

Figure 24:
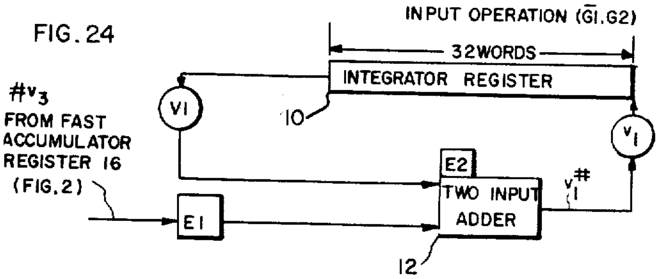
FIGURE 24 is a schematic diagram of the manner in which the system of the invention performs an input operation.

The input operation described in the preceding paragraphs is illustrated schematically in FIGURE 24. As shown in FIGURE 24, during the input operation, the output $v_3\#$ from the emitter follower 20 in FIGURE 2 is introduced to the flip-flop (E1), and the output of the flip-flop (E1) is fed into the adder 12. The output of the amplifier V1 is also fed into the adder 12.

The input to the flip-flop (E1) during the input operation may be represented by the following logic equations:

$$\underline{e}_1=v_3{}^{\#}[\overline{A3}.S.P21+\overline{G1}.G2(P0\text{–}P4)]$$
$$\overline{e}_1=\overline{v}_3{}^{\#}[\overline{A3}.S.P21+\overline{G1}.G2(P0\text{–}P4)]$$

G1 bit is in the flip-flop (A3) and the G2 bit is represented by the term S.P21. Then during the (P0–P4) bit times of the input operation word time, the G1 and G2 bits are held in the flip-flops (G1) and (G2), as explained above. Therefore, whenever these bits are programmed to have a $\overline{G1}$.G2 coding, an input operation takes place. This input operation extends from P21 to P4 bit times. The fast accumulator register actually is timed to be one bit time out of step with the integrator register, so that the input operation causes the six least significant bits of the 7-bit fast accumulator word to be read serially into the flip-flop (E1) advanced by one bit time. This causes the output of the flip-flop (E1) to be on time with respect to the integrator register 10 and with the general purpose computer.

The different input operations ($\overline{G1}$.G2) are made to occur with sufficient frequency so that the increment accumulations of the different terms in the fast accumulator never exceed six bits. Also, the $\overline{G1}$.G2 code is programmed into the S track of the drum 30 to occur at the different word times during each 32-word interval at which different ones of the 7-bit words in the accumulator line up with their corresponding terms in the integrator register. Therefore, in the manner described above, after information from the fast accumulator is read through the flip-flop (E1) into the adder 12, as shown in FIGURE 24, it lines up with the information from the amplifier V1, so that the accumulated increments of the different terms in the fast accumulator can be added into the least significant digit positions of the corresponding terms in the integrator register. As noted above, these input operations can be programmed to occur at successive word times, so that the different fast accumulator words can be added into their corresponding terms in the integrator register at the times they successively line up with their corresponding term in the manner shown in FIGURE 9.

During the input operation, the flip-flop (E2) serves as a normal carry flip-flop. This function of the flip-flop (E2) is represented by the terms:

$$\underline{e}_2=E1.V1.\overline{P21}(\overline{G1}+\overline{G2})$$
$$\overline{e}_2=\overline{E1}.\overline{V1}.(\overline{G1}+\overline{G2})$$

As described above, the accumulated increments from the fast accumulator represent velocity changes which occur in pre-determined time intervals, and the corre-sponding terms in the integrator register represent actual velocity at any particular time. These latter terms may be integrated in accordance with a second operation of the nput-output system of the invention to form respective listance terms. This integration operation is carried out n accordance with the schematic diagram of FIGURE :5.

Figure 5:
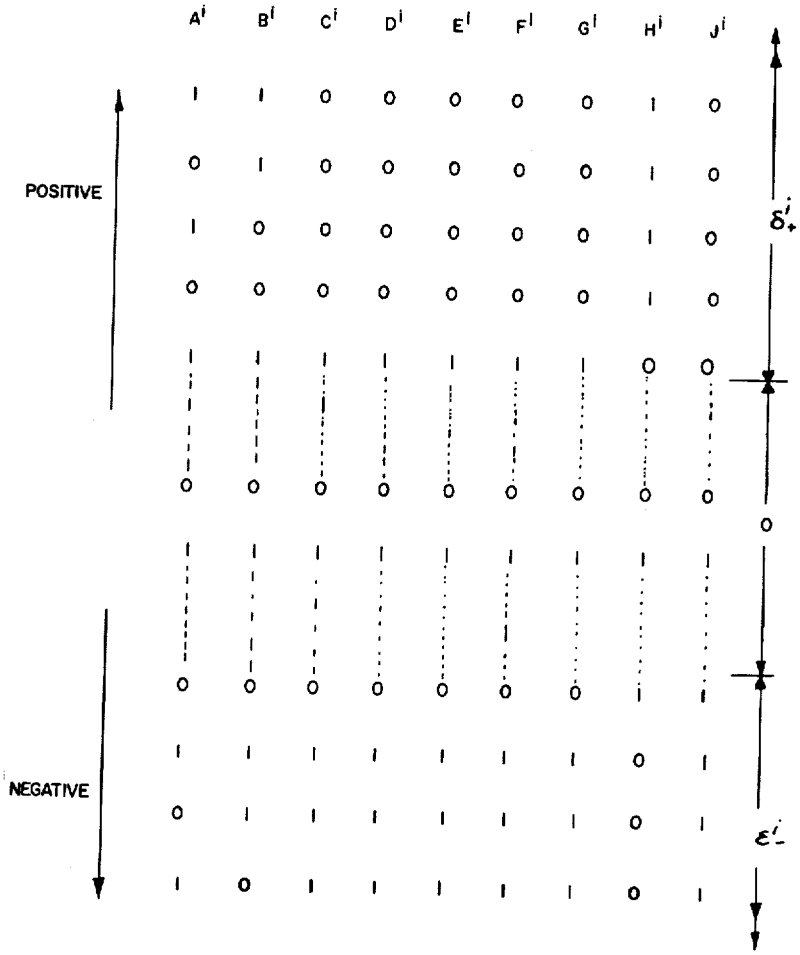
FIGURE 5 is a table representing the various configurations of the counter of FIGURE 4.
Figure 25:
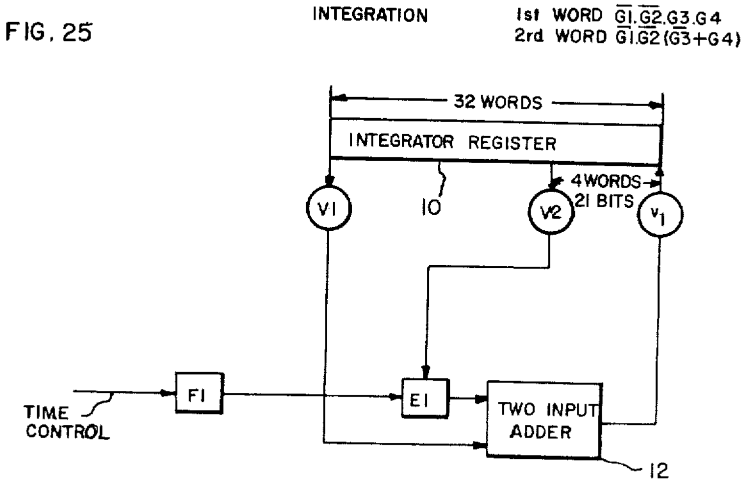
FIGURE 25 is a schematic block diagram of the manner in which the system of the invention performs an integration operation.

As each new velocity term is formed by the correspond-ng input operation described above in conjunction with 'IGURE 24, it is written into the integrator register 10 rough the amplifier $v_1$ and through the write head as-ociated therewith. The read head associated with the ead amplifier V2 in FIGURE 25 is displaced from the rite head associated with the write amplifier $v_1$ along e integrator register channel by four words and 21 bits r an integration operation, and as shown in FIGURE 5, the output of the amplifier V2 is read into the flip-p (E1), under the control of the time standard flip-p (F1). At the same time, the output from the am-ifier V1 is read into the adder 12. The read head asso-ated with the read amplifier V1 is displaced 32 words ong the integrator register channel from the write head sociated with the amplifier $v_1$.

The output from the read amplifier V1, during a selected word time integration, is a number representing the previous integral of the velocity term written into the integrator register 10. This previous integral represents the distance vector travelled in that particular time along the axis corresponding to the axis of the corresponding velocity term. The new velocity term is multiplied by a time increment $\Delta T=1$ and added to the previous integral if the time control flip-flop (F1) is set high to indicate a time increment $\Delta T=1$. Conversely, the output from the amplifier V1 is circulated through the adder 12 unchanged if the time standard flip-flop (F1) is set low to represent a time increment $\Delta T=0$.

Therefore, the integrator register 10 contains a plurality of terms (each two words in length) representing the integrals of the different velocities, which integrals represent the respective distance vectors travelled along the different axes as time accumulates. The register 10 also includes a plurality of one-word integrand terms, these integrand terms representing the different velocities introduced from the fast accumulator register into the integrator register. These integrand terms are one word in length, and they are effectively multiplied during the different integration operations by the time increment $\Delta T=1$ or $\Delta T=0$ (as formed by the flip-flop F1) to form distance terms which are added to the previous integrals in the integrator register to provide new distance terms. It should be reiterated, that the actual integration-addition takes place only if the flip-flop ($F_1$) is high to indicate the presence of a $\Delta T=1$ term.

Each of the distance vector terms (integrals) stored in the integrator register and derived from the amplifier V1 during an integration operation is two words in length, as mentioned above; and each of the velocity terms (integrands) stored in the integrator resistor and derived from the amplifier V2 during an integration operation is one word in length. Therefore, each integrating operation takes two word times. During the first word time of an integration operation, the control flip-flops assume the configuration $\overline{G1}.\overline{G2}.G3.G4$, and the one word integrand is added into the least digit positions of the corresponding two word integral (if the flip-flop F1 is in its true state). During that operation, the flip-flop (E2) functions as a normal carry flip-flop. During the second word time of the integration operation, the control flip-flops assume the configuration $$\overline{G1}.\overline{G2}(G3+G4)$$

If an integration operation ($\overline{G}.\overline{G2}.G3.G4$) is to follow immediately after an input operation ($\overline{G_1}$.G2), it is necessary for the flip-flop (G4) to be false at P21 bit time at the end of the input operation word time. This is achieved by making the bit G4 in the S track a zero during the input operation, so that the term $\overline{g}_4=\overline{S}.P16$ sets the flip-flop low at P16 bit time to remain low until P21 bit time. This setting of the flip-flop (G4) low is necessary, so that the carry flip-flop (E2) may be reset false at P21 bit time to prevent any carry propagated during the input operation from being introduced into the first word of the integration operation. This resetting of the flip-flop (E2) false at P21 bit time of the input operation has no effect on the input operation itself. The flip-flop E2 is reset false at P21 bit time at the end of the input operation in accordance with the following equation:

$$\overline{e}_2=P21(G1+G2+\overline{G3}+\overline{G4})$$

The above equation causes the carry flip-flop ($E_2$) to be reset false at the end of all operations, except at the end of the first word time of an integration operation. This exception is necessary in order that any carry formed at the end of the first word time of an integration operation may be propagated into the second word time of the integration operation.

For the first word time of an integration operation, the bits G1(P20) and G2(P21) in the preceding word of the S track are both made zero, and the flip-flops G1 and G2 are set low at P21 bit time in the prior word time, and the flip-flops G3 and G4 are set high at P21 bit time of the prior word time. These controls are in accordance with the following logic equations:

$$\bar{a}_3=\bar{S}.P20$$
$$\bar{g}_1=\overline{A3}.P21$$
$$\bar{g}_2=\bar{S}.P21$$
$$g_3=\bar{A}_3.P21$$
$$g_4=\overline{A3}.P21$$

For the second word time of an integration operation, the flip-flops (G1) and (G2) remain low and the flip-flop (G4) is set low at P21 bit time at the end of the first word time by the term.

$$\bar{g}_4=\overline{G1}.\overline{G2}.G3.P21$$

During each integration operation, and as described above, the number in an integrand word is read by the read amplifier V2 of FIGURE 1, and that number is added during the first integration word time with the corresponding integral as read by the amplifier V1. This process, as noted, is illustrated schematically in FIGURE 25. The placement of the amplifier V2 is such that an integrand is serially read by that amplifier five word times after it is introduced to the integrator register 10 by the amplifier $v_1$. A time increment of ΔF is implicit in the operation, as noted, since the adding occurs at regular intervals corrected by the time standard operation.

The second integration word time follows the first integration word time, and the "carry" is propagated into the second integration word time, as noted above. The control of the carry flip-flop (E2) during the integration operation is as follows:

$$e_2=E1.V1.\overline{G1}.\overline{G2}.G3.G4$$
$$\bar{e}_2=\overline{E1}.\overline{V1}(\overline{G1}+\overline{G2})$$

The integrating operations may be represented by the following terms:

$$e_1=V2.F1.\overline{A3}.\bar{S}(\overline{G4}+G1)P21+\overline{G1}.\overline{G2}.G3.G4.\overline{P21}$$
$$\bar{e}_1=\overline{A3}.\bar{S}.P21(\overline{V2}.G1+\overline{V2}.\overline{G4}+\overline{F1}.G1+\overline{F1}.\overline{G4})+\overline{V2}.\overline{G1}.\overline{G2}.G3.G4.\overline{P21}$$

It will be noted that during the integrating operation, the output from the amplifier V2 is read through the flip-flop (E1). That output must, therefore, be one bit time in advance of the output from the amplifier V1. Therefore, it is necessary for the flip-flop (E1) to be controlled at P21 bit time for the first bit of the integration. This control is effectuated by the term $\overline{A3}$ which holds the G2 bit, and by the term $\bar{S}$ which holds the G1 bit, at P21 bit time.

As noted from the above equations, the integration operation is under the control of the flip-flop (F1). The flip-flop (F1) and the flip-flop (F2) are the time standard control flip-flops of the system. The logic associated with these flip-flops is set out in FIGURES 22 and 23. As shown in the time diagram of FIGURE 26, the time standard pulses ΔF (curve A) derived from the precision frequency source 370 in FIGURE 23 may have a precisely stabilized repetition frequency of 180 pulses per second. The bits F1 and F2 recorded in the S track of the memory drum 30 in FIGURE 10, as read at P7 and P8 bit times of each 32nd word time (half drum revolutions) respectively (curves B and C) may have a repetition frequency of 200∓5% pulses per second, as determined by the actual drum revolution rate.

The flip-flop (F2) is controlled to be set high by successive ones of the ΔF pulses of curve A and to be set low by corresponding ones of the *S.P8* pulses of curve C. The states of the flip-flop (F2) are represented schematically by the curve D in FIGURE 26. It will be noted that certain ones of the *S.P8* pulses have no effect on the flip-flop (F2), because that flip-flop is already in its false state when such pulses occur. Each of these latter situations occurs when the S.P7 and S.P8 pulses have shifted with respect to the time standard pulses ΔF, such that two S.P8 pulses occur in the interval between successive ΔF time standard pulses.

Figure 26:
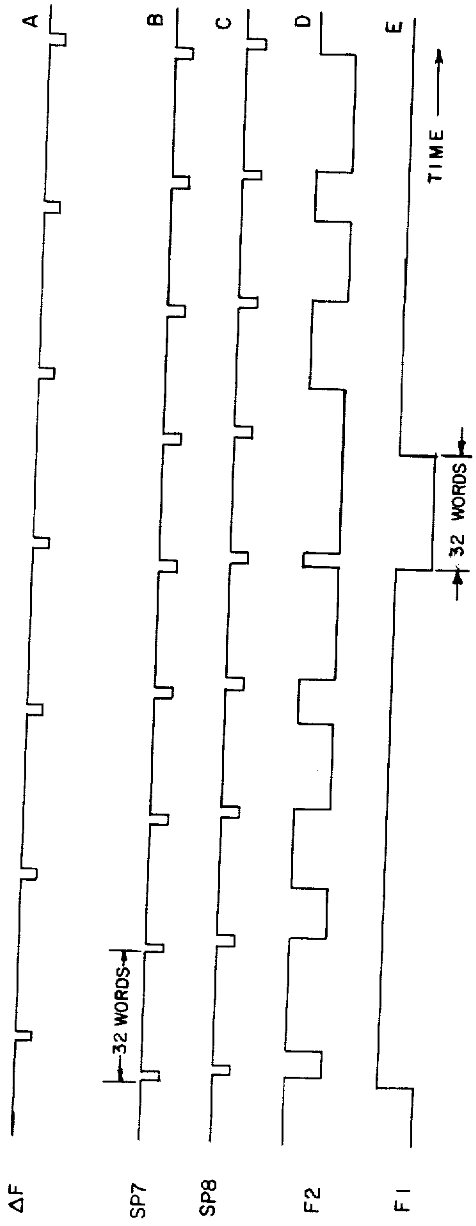
FIGURE 26 is a timing diagram including a series of curves useful in explaining a time standard function performed by the system of the invention in accumulating and utilizing real time increments.
Figure 29:
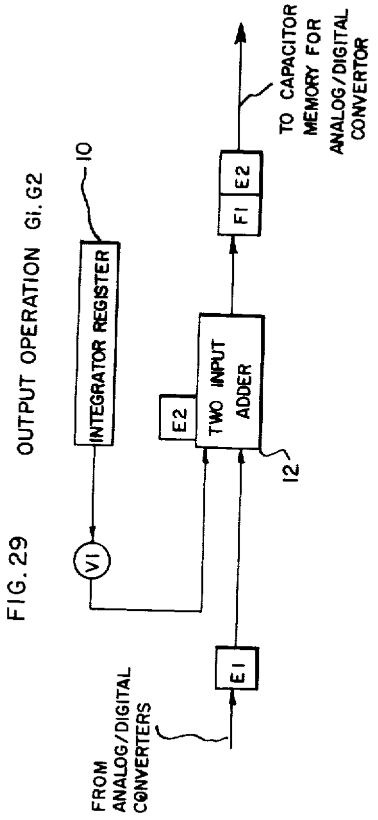
FIGURE 29 is a schematic block diagram of the manner in which the input-output system of the invention performs an output operation.

The flip-flop (F1), as shown by the curve E in FIGURE 26, is set high by a S.P7 pulse of FIGURE 26, and the flip-flop (F1) remains high so long as the flip-flop (F2) is true at the occurrence of succeeding S.P7 pulses. This will occur only if a ΔF pulse occurred between each succeeding pair of S.P7 pulses to set the flip-flop (F2) true. When the condition is reached where two S.P7 pulses occur between successive ΔF pulses, the flip-flop (F2) is false at the time of the second S.P7 pulse, and this permits the second S.P7 pulse to set the flip-flop (F1) false. The flip-flop (F1) then remains false for thirty-two word times until the next S.P7 pulse sets it true. The states of the flip-flop (F1) are shown schematically by the curve E of FIGURE 26.

Therefore, for each successive thirty-two word interval in which no time standard correction is to be made, the flip-flop (F1) is set true, and all integrations and time signal operations occurring during each such thirty-two word interval are made on the basis of the time increment $\Delta T=-1$. On the other hand, when a time standard correction is to be made, the flip-flop (F1) is set low for the thirty-two word interval, and during that interval the term $\Delta T=0$ and no integrations or time increment operations are carried out. Therefore, and as shown by the logic diagram of FIGURE 20, all integrations and time signal operations are made under the control of the flip-flop (F1).

To sum up, therefore, the P7 and P8 bit positions on the S track (FIGURE 12) will contain "ones" once in each 32 words, as the bit F1 and F2 are each a one at that time. In all other words, these bits are each zero. The resulting terms S.P7 and S.P8 are used in the described manner as time standard synchronizers. As noted above, the terms S.P7 and S.P8 each recur at a rate of 200 per second ±5% as determined by the drum revolution rate; whereas, the time standard pulses ΔF recur at a precisely controlled rate of 180 per second. These two out-of-phase timing signals control the flip-flop (F1), and this flip-flop acts as a gate in the described manner during the time signal and integration functions. The flip-flop (F1) allows time increments to be added when it is in a true state and prevents any addition when it is in a false state. About every ten cycles, the time increment is skipped by the flip-flop (F1) going false, thus adjusting the discrepancy between real time and drum time.

Figure 27:
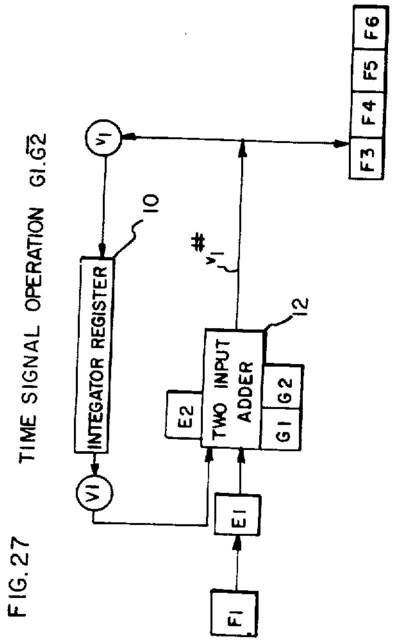
FIGURE 27 is a schematic diagram of the manner in which the input-output system of the invention performs a time signal count down operation.

Real time may be accumulated in the integrator register in the manner represented schematically in FIGURE 27. As shown in FIGURE 27, the flip-flop (E1) is controlled by the time standard flip-flop (F1) so that time increments can be introduced to the adder 12, or skipped, under control of the latter flip-flop.

The flip-flop (F1) for time increment accumulation is controlled in accordance with the following equations:

$$e_1=A3.\bar{S}.F1.P21$$
$$\bar{e}_1=A3.\bar{S}.\overline{F1}.P21$$

This control is carried out at P21 bit time of the word time preceding the word time at which a time increment accumulation is to be made. Therefore, if the G1 bit (contained in the flip-flop (A3)) is a one, and if the G2 bit (read from the S track) is a zero; a time accumulation operation is indicated for the following word time. A negative time increment $\Delta T=-1$ is then added into the P0 bit position of the next word if the flip-flop (F1) is in its true state, and a zero time increment $\Delta T=0$ is added into the P0 bit position of the next word if the flip-flop (F1) is in its false state. The particular system under consideration utilizes negative time increments rather than positive time increments, merely to simplify the required logic circuitry.

Therefore, in each thirty-two word interval, provision may be made in the integrator register 10 of FIGURE 1 for a word position which contains a number indicating the elapsed real time from a given reference. This number may be made available for the general purpose computer whenever the computer requires such information.

Moreover, other word positions may be made available in the integrator register in which different numbers may be introduced for count down purposes. Then, the negative time increments are added into each of these numbers, likewise under the control of the flip-flop (F1), and at the appropriate word times. During these operations, the flip-flop (E2) serves as a normal carry flip-flop.

In the particular embodiment of the invention under consideration, four different positions may be provided in the integrator register for four different numbers for count down purposes. These numbers are simultaneously counted down to zero, by the addition of negative time increments to them under the control of the flip-flop (F1). The sign digit of each of the numbers is sampled by a different one of the flip-flops (F3–F6), so that a corresponding indication may be made when each of these sign digits changes from one form to another.

Figure 28:
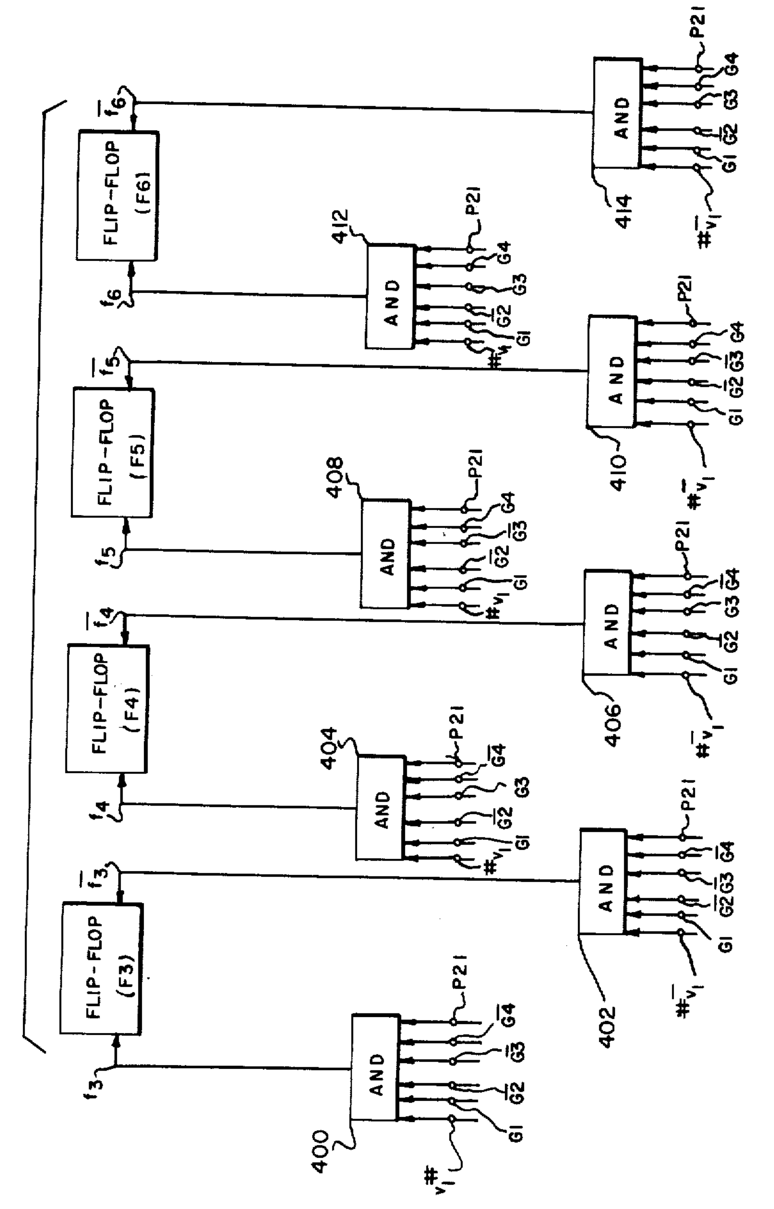
FIGURE 28 is a logic block diagram of a series of time selection flip-flops and of the logic components associated therewith.

The time selection flip-flops (F3) (F4) (F5) and (F6) are illustrated in FIGURE 28. An "and" gate 400 is connected to the true input terminal $f_3$ of the flip-flop (F3), and an "and" gate 402 is connected to the false input terminal $\bar{f}_3$ of that flip-flop. The terms $\#v_1$, G1, $\overline{G2}$, $\overline{G3}$, $\overline{G4}$, P21 are introduced to the "and" gate 400. The terms $\#\bar{v}_1$, G1, $\overline{G2}$, $\overline{G3}$, $\overline{G4}$ and P21 are introduced to the "and" gate 402.

An "and" gate 404 is connected to the true input terminal $f_4$ of the flip-flop (F4), and an "and" gate 406 is connected to the false input terminal $\bar{f}_4$ of that flip-flop. The terms $\#v_1$, G1, $\overline{G2}$, G3, $\overline{G4}$ and P21 are introduced to the "and" gate 404. The terms $\#\bar{v}_1$, G1, $\overline{G2}$, G3, $\overline{G4}$ and P21 are introduced to the "and" gate 406.

An "and" gate 408 is connected to the true input terminal $f_5$ of the flip-flop (F5), and an "and" gate 410 is connected to the false input terminal $\bar{f}_5$ of that flip-flop. The terms $\#v_1$, G1, $\overline{G2}$, $\overline{G3}$, G4 and P21 are introduced to the "and" gate 408. The terms $\#\bar{v}_1$, G1, $\overline{G2}$, $\overline{G3}$, G4 and P21 are introduced to the "and" gate 410. An "and" gate 412 is connected to the true input terminal $f_6$ of the flip-flop (F6), and an "and" gate 414 is connected to the false input terminal $\bar{f}_6$ of that flip-flop. The terms $\#v_1$, G1, $\overline{G2}$, G3, G4, P21 are introduced to the "and" gate 412. The terms $\#\bar{v}_1$, G1, $\overline{G2}$, G3, G4 and P21 are introduced to the "and" gate 414.

As shown by the table of FIGURE 18, and as described above, the order code for the time accumulation is G1.$\overline{G2}$. That order code is set up at P21 bit time at the end of the word time preceding the word at which the accumulation operation is to be carried out, as noted above. During the time accumulation word time, a time increment $\Delta T=-1$ or $\Delta T=0$ is added into the corresponding time word. This addition is made by setting the flip-flop (E1) high for $\Delta T=-1$ addition, and allowing it to remain high for the entire word time; or by setting the flip-flop (E1) low for a $\Delta T=0$ operation and allowing it to remain low for the entire word time.

For corresponding ones of the count down words in the integrator register, the G3 and G4 bits in the S track of the memory drum of FIGURE 10 are used to control the flip-flops (G3) and (G4), so that the flip-flops (F3–F6) of FIGURE 28 may be set at the following P21 bit time to sample the sign bit of the corresponding words. Therefore, any change in the sign bit will be detected by the corresponding one of the flip-flops (F3–F6) to indicate a count down from +1 to −1 of the corresponding word.

For the real time accumulation word, on the other hand, whose sign digit is not to be sensed by any one of the flip-flops (F3–F6), the flip-flops (G1) and (G2) are set to the $\overline{G1}$.G2 configuration at P7 bit time during the time accumulation word time. This causes the flip-flops (F3–F6) to be disabled (as seen by the logic of FIGURE 28) at the following P21 bit time at which the sign bit of the time accumulation word would normally be sampled. This has no effect on the flip-flop (E1) which continues in its previous state until the next P21 bit time. The flip-flops (G1) and (G2) are set to the $\overline{G1}$.G2 configuration by the term S.P7 (FIGURE 19). This term is controlled by the F1 bit in FIGURE 12, and the system is programmed so that the F1 bit is a "one" only at the word time of the accumulated real time word, which word time occurs once for each thirty-two words in each half drum revolution. It will be remembered that the F1 bit is used to control the F1 flip-flop during the time standard operation.

To reiterate, therefore, it is again pointed out that for the time accumulation and time signal count down functions, the flip-flops (G1) and (G2) are set to G1.$\overline{G2}$ in the preceding word time. The flip-flops (G3) and (G4), on the other hand, are set during the word times of the functions themselves. That is, if a time output is to occur in word time ($n$), then the flip-flop (G1) is set high by the term $g_1=S.P21$ and the flip-flop (G2) is set low by the term $\bar{g}_2=\bar{S}.P21$ (FIGURE 19) in the word time ($n-1$). The flip-flops (G3) and (G4), on the other hand are set by the term S.P15, $\bar{S}$.P15 and S.P16, $\bar{S}$.P16, respectively, during the word time ($n$).

As noted above, in conjunction with FIGURE 28, the terms G1 and $\overline{G2}$ specify a time signal operation, whereas the terms G3 and G4 select the flip-flops (F3–F6) in accordance with the code table of FIGURE 18. The selected one of the flip-flops (F3–F6) reads the sign bit of the number in the corresponding time signal word. As described, the numbers in the different time signal words are counted down by the time increments; and at the time when each individual count down is complete, the corresponding number changes sign and the corresponding one of the flip-flops (F3–F6) changes its state in response to the sign "1."

As also described, a real time accumulation is provided at a particular word position in the integrator register of FIGURE 1. This is to provide some recording of elapsed real time from a given reference for computation purposes. This operation starts as a time signal operation with the flip-flops (G1) and (G2) in the G1.$\overline{G2}$ configuration. However, by requiring that this word position be programmed in the S track (FIGURE 12) in the same word as the time standard synchronizing bits F1 and F2, the time signal code G1.$\overline{G2}$ is changed at P7 bit time to the input code $\overline{G1}$.G2 by the synchronizing pulse S.P7. This, as described, prevents any of the flip-flops (F3–F6) from being activated at the following P21 bit time. Moreover, since the "input" command only adds the fast accumulator number $v_3\#$ into the first six bits of the input word, this change to "input" occurs after any actual input would occur.

For each output operation, the flip-flops (G1–G4) are set in the word time prior to the output word time. As shown in the table of FIGURE 18, the output operation is designated by the configuration G1.G2 of the flip-flops (G1) and (G2). The different output operations may then be selected by appropriate configurations of the flip-flops (G3) and (G4) in accordance with the code shown in the table of FIGURE 18.

The output operation consists in determining the difference between a particular output word in the integrator register 10 of FIGURE 1 and the number read by the brushes of a selected one of a group of analogue-to-digital converters. The resulting error signal is used in an appropriate servo mechanism to rotate that particular analogue-to-digital converter to a position analogous to the number in the selected output word at which the error signal is reduced to zero. This position then represents the analogue equivalent of the corresponding output word.

For each output operation, the terms $$e_1=G1.G2(P0.M0+\ .\ .\ .\ P12.M12)$$
$$\bar{e}_1=G1.G2(P1.M1^*+\ .\ .\ .\ P12.M12^*)$$

These terms cause the flip-flop (E1) to read the brushes of the selected analogue-to-digital converter disk in the manner described, for example, in co-pending application, SN 836,532; filed August 27, 1959. As described in that application, each track on the converter disk, except the least significant digit track, includes a pair of brushes. The least significant digit track has but one brush "M0." and the other tracks respectively include pairs of brushes M1, M1*; M2, M2*; . . . M12, M12*. The flip-flop E1 reads the converter disk brushes, starting with the least significant digit brush "M0" and continuing from brush to brush. If any selected brush reads a "1," the next higher odd starred brush is selected, and vice versa. This process, as fully explained in the co-pending application, resolves reading ambiguities.

As shown in FIGURE 18, three different output operations involving, for example, three different output words in the integrator register 10, respectively, representing elevation, azimuth and altitude, are possible with the particular system under consideration. Each one of these output operations consists in positioning by an appropriate servo mechanism a corresponding shaft to an angular position representative of the corresponding output number in the integrator register. This is achieved in each instance, as noted above, by coupling an analogue-to-digital converter to the shaft and by comparing the digital output from the converter with the corresponding output number in the integrator register. Any difference between these two numbers produces a plus, or minus, or zero error signal, and that error signal is applied to the servo mechanism to rotate the shaft in a direction to reduce the error signal to zero.

In order to permit the flip-flops (F1) and (E2) to be used on a time-shared basis for the output operations the output words are limited to 13 bits with the sign bit occurring at P13 bit time The flip-flop (F1) is caused to introduce its time increment indication into the shaft accumulator register 16 of FIGURE 2 at P21 bit time, as indicated in FIGURE 2, and as evidenced by the terms:

$$v_3=F1.P21$$
$$\bar{v}_3=\overline{F1}.P21$$

This operation causes the dummy bits (FIGURE 8) in the fast accumulator register 16 of FIGURE 2 to be used to store the contents of the flip-flop (F1) while that flip-flop is used for the output operations. Then, during the P14 bit time during an output operation, the flip-flop (F1) looks to the flip-flop (A3) to recover its time increment information. This is evidenced by the terms:

$$f_1=G1.G2.A3.P14$$
$$\bar{f}_1=G1.G2.\overline{A3}.P4$$

Therefore, the shifting described in conjunction with FIGURE 8 is achieved by the circulating of the information through the flip-flop (A3) at the times described above. The resulting dummy bits appear in A3 at P14 bit time, and are used to set the flip-flop (F1) at that time. The dummy bit is then held in the flip-flop (F1) until the following P21 bit time when it is again introduced to the amplifier $v_3$.

It should be pointed out that, normally, an output operation must be spaced by at least two word times, from a time standard word so that each of the three dummy bits of FIGURE 8 will contain the most recent contents of the flip-flop (F1).

The flip-flop (F1) can now be used to scan for "ones" in the output of the adder 12 during the output operations. It is evident that the presence of a "one" in the output from the adder indicates a difference between the word derived from the selected analogue-to-digital converter and the corresponding output word in the integrator register. This scanning operation is evidenced by the term $$f_1=\#v_1(P1\text{–}P13)G1.G2$$

During the output operation the carry flip-flop (E2) is set for difference carry logic. This is evidenced by the terms $$e_2=G1.G2.E1.\overline{V1}(P0\text{–}P12)$$
$$\bar{e}_2=G1.G2.\overline{E1}.V1(P0\text{–}P12)$$

During the output operation, the flip-flop (E2) is also used to sense the sign of any difference detected by the flip-flop (F1) between the number read from the selected analogue-to-digital converter and the corresponding output number in the integrator register. This is in accordance with the terms:

$$e_2=G1.G2\#v_1.P13$$
$$\bar{e}_2=G1.G2\#v_1.P13$$

The following appendix lists the different logic equations applicable to the system described above.

*Appendix*

VELOCITY INPUT—MINUS VALUES $$\begin{aligned}a_1 = {} & \#P_Y\bar{A}_4\bar{A}_5\bar{A}_6\#\epsilon\text{–}0\\ & +\#P_YA_4\bar{A}_5\bar{A}_6\#\epsilon\text{–}1\\ & +\#P_Y\bar{A}_4A_5\bar{A}_6\#\epsilon\text{–}2\\ & +\#P_YA_4A_5\bar{A}_6\#\epsilon\text{–}3\\ & +\#P_Y\bar{A}_4\bar{A}_5A_6\#\epsilon\text{–}4\\ & +\#P_YA_4\bar{A}_5A_6\#\epsilon\text{–}5\\ & +\#P_Y\bar{A}_4A_5A_6\#\epsilon\text{–}6\\ & +\#P_YA_4A_5A_6\#\epsilon\text{–}7\end{aligned}$$

$$\bar{a}_1 = \#P_X$$

Accepts value of −1 from input 0 at $P_5+P_{13}+P_{20}$.
Accepts value of −1 from input 1 at $P_5+P_{13}+P_{20}$.
Accepts value of −1 from input 2 at $P_5+P_{13}+P_{20}$.
Accepts value of −1 from input 3 at $P_5+P_{13}+P_{20}$.
Accepts value of −1 from input 4 at $P_5+P_{13}+P_{20}$.
Accepts value of −1 from input 5 at $P_5+P_{13}+P_{20}$.
Accepts value of −1 from input 6 at $P_5+P_{13}+{}_{20}$.
Accepts value of −1 from input 7 at $P_5+P_{13}+P_{20}$.
Reset at $P\ +P_{11}+P_{19}$.

VELOCITY INPUT—POSITIVE VALUE AND CARRY $$\begin{aligned}a_2 = {} & \#P_Y\bar{A}_4\bar{A}_5\bar{A}_6\#\delta+0\\ & +\#P_YA_4\bar{A}_5\bar{A}_6\#\delta+1\\ & +\#P_Y\bar{A}_4A_5\bar{A}_6\#\delta+2\\ & +\#P_YA_4A_5\bar{A}_6\#\delta+3\\ & +\#P_Y\bar{A}_4\bar{A}_5A_6\#\delta+4\\ & +\#P_YA_4\bar{A}_5A_6\#\delta+5\\ & +\#P_Y\bar{A}_4A_5A_6\#\delta+6\\ & +\#P_YA_4A_5A_6\#\delta+7\\ & +V_3A_1\end{aligned}$$

$$\begin{aligned}\bar{a}_2 = {} & \#P_Z\\ & +\bar{V}_3\bar{A}_1\end{aligned}$$

Accepts value of +1 from input 0 at $P_5+P_{13}+P_{20}$.
Accepts value of +1 from input 1 at $P_5+P_{13}+P_{20}$.
Accepts value of +1 from input 2 at $P_5+P_{13}+P_{20}$.
Accepts value of +1 from input 3 at $P_5+P_{13}+P_{20}$.
Accepts value of +1 from input 4 at $P_5+P_{13}+P_{20}$.
Accepts value of +1 from input 5 at $P_5+P_{13}+P_{20}$.
Accepts value of +1 from input 6 at $P_5+P_{13}+P_{20}$.
Accepts value of +1 from input 7 at $P_5+P_{13}+P_{20}$.
Normal carry.
Reset at $P_4+P_{11}+P_{19}$.
Carry reset.

| Equation | Description |
|---|---|
| | DELAY |
| $a_3 = \#v_3\#\overline{P}_{20}$ | Copies emitter follower output of $V_3$ adder at all times except $P_{20}$. |
| $+\overline{S}\#P_{20}$ | Accepts $G_1$ control information from the S track at $P_{20}$ and furnishes 1 bit delay, then to $G_1$ for start of next word. |
| $\overline{a}_3 = \#\overline{v}_3\#\overline{P}_{20}$ | Copies emitter follower output of $V_3$ adder at all times except $P_{20}$. |
| $+\overline{S}\#P_{20}$ | Accepts $G_1$ control information from the S track at $P_{20}$ and furnishes 1 bit delay, then to $G_1$ for start of next word. |
| | VELOCITY INPUT SELECTOR |
| $a_4 = \#P_Z$ | Counts pulses each $P_4+P_{11}+P_{19}$. |
| $\overline{a}_4 = \#P_Z$ | Do. |
| $+S\#P_{17}$ | A one on the S track every eight word resets $A_4$ if not already reset. |
| | VELOCITY INPUT SELECTOR |
| $a_5 = \#P_ZA_4$ | Counts pulses each $P_4+P_{11}+P_{19}$ and $A_4$. |
| $\overline{a}_5 = \#P_ZA_4$ | Do. |
| $+S\#P_{17}$ | A one on the S track every eighth word resets $A_5$ if not already reset. |
| | VELOCITY INPUT SELECTOR |
| $a_6 = \#P_ZA_4A_5$ | Counts pulses each $P_4+P_{11}+P_{19}$ and $A_4A_5$. |
| $\overline{a}_6 = \#P_ZA_4A_5$ | Do. |
| $+S\#P_{17}$ | A one on the S track every eighth word resets $A_6$ if not already reset. |
| | INPUT—DELAY INTEGRAND |
| $e_1 = V_2F_1[\overline{A}_3\overline{S}P_{21}(\overline{G}_4+G_1)+\overline{G}_1\overline{G}_2G_3G_4\overline{P}_{21}]$ | Since the $V_2$ read head is spaced 4 words 21 bits from $v_1$ write head the L.S.D. of the integrand must be read at $P_{21}$ of the word prior to the first word of integration to appear on $E_1$ at $P_0$ during first word integration. $\overline{A}_3\overline{S}P_{21}$ states next bit starts first word of integration $-\overline{G}_4+G_1$ that we are not in first word of integration and $F_1$ specifies negative time increment. $\overline{G}_1\overline{G}_2G_3G_4\overline{P}_{21}$ gate next 21 bits of integrand in first word. |
| $+\#v_3(\overline{A}_3SP_{21}+\overline{G}_1G_2P_{0/4})$ | Output of fast accumulator L.S.D. is copied at $P_{21}$ so as to appear on $E_1$ at $P_0$ during input, with remaining five bits copied during $P_{0/4}$ of input word. |
| $+A_3\overline{S}F_1P_{21}$ | Negative time increment is added to negative time accumulation. |
| $+G_1G_2(P_0M_0+\ \ldots\ \text{thru}+P_{12}M_{12})$ | Reads code disc brushes. Starting with L.S.D. if brush 1 read next higher order starred brush—if 0 read next higher order unstarred brush. |
| $\overline{e}_1 = (\overline{V}_2+\overline{F}_1)[\overline{A}_3\overline{S}P_{21}(G_1+\overline{G}_4)+\overline{G}_1\overline{G}_2G_3G_4\overline{P}_{21}]$ | See $E_1$ above same term for explanation. |
| $\#\overline{v}_3(\overline{A}_3SP_{21}+\overline{G}_1G_2P_{0/4})$ | Do. |
| $+A_3\overline{S}\overline{F}_1P_{21}$ | Do. |
| $+A_3SP_{21}$ | Resets $E_1$ for code disc scan prior to output. |
| $+G_1G_2(P_1M_1^*\ \ldots\ \text{thru}+P_{12}M_{12}^*$ | See $E_1$ above same term for explanation. |
| | CARRY—INTEGRAND |
| $e_2 = E_1V_1\overline{P}_{21}(\overline{G}_1+G_2)$ | Represents normal carry logic except in the case of output and integration. |
| $+E_1V_1\overline{G}_1\overline{G}_2G_3G_4$ | Represents normal carry logic for integration. |
| $+G_1G_2E_1\overline{V}_1P_{0/12}$ | Difference carry logic used for output. |
| $+G_1G_2\#v_1P_{13}$ | Error sign storage for output. |
| $\overline{e}_2 = \overline{E}_1\overline{V}_1(\overline{G}_1+\overline{G}_2)$ | Represents normal carry logic except in the case of output. |
| $+G_1G_2\overline{E}_1V_1P_{0/12}$ | Difference carry logic used for output. |
| $+G_1G_2\#\overline{v}_1P_{13}$ | Error sign storage for output. |
| $+P_{21}(G_1+G_2+\overline{G}_3+\overline{G}_4)$ | Carry reset at the end of all operations except at the end of first word of integration. |
| | TIME INCREMENT |
| $f_1 = SP_7$ | Two locations on the S track—5 ms apart hold F control bit information. $F_1$ will be set if not already set so that $\overline{F}_1$ can hold time increment if one has occurred. |
| $+G_1G_2A_3P_{14}$ | The state of $F_1$ will be reestablished at $P_{14}$ of an output word. The condition of $F_1$ is written each word time at $P_{21}$ on the Fast Accumulator, and $F_1$'s condition remains unchanged except in an output word where it is used to scan for ones. |
| $+\#v_1P_{1/13}G_1G_2$ | During an output word $P_{1/13}$ $F_1$ will be set by a one appearing on the output of $\#v_1$. |
| $= A_3S\#P_{21}$ | $A_3$ holds $G_1$ and S holds $G_2$ information. At $P_{21}.G_1\ G_2$ resets $F_1$ at the start of an output word so that it can scan for ones. |
| $+G_1G_2\overline{A}_3P_{14}$ | The state of $F_1$ will be reestablished at $P_{14}$ of an output word. |
| $+\overline{F}_2SP_7$ | Two locations on the S track—5 ms apart hold F control bit information. Time increments occur 5.5 ms apart Setting $F_2$ (which is reset at $P_8$) same word. If $F_2$ is reset at $P_7$ no time increment occurred resetting $F_1$. |
| | TIME INCREMENT |
| $= \Delta F$ | Pulse slightly less than 2 bit times in length occurring 5.5 ms apart (180 cycles) from time standard. |
| $= SP_8$ | F control bit on S track 5 ms apart to determine if time increment has occurred. |
| | TIME SIGNAL OUTPUT |
| $= \#v_1G_1\overline{G}_2\overline{G}_3\overline{G}_4\#P_{21}$ | Reads sign from integrand word for time signal output 1. |
| $= \#\overline{v}_1G_1\overline{G}_2\overline{G}_3\overline{G}_4\#P_{21}$ | Do. |
| | TIME SIGNAL OUTPUT |
| $= \#v_1G_1\overline{G}_2G_3\overline{G}_4\#P_{21}$ | Reads sign from integrand word for time signal output 2. |
| $= \#\overline{v}_1G_1\overline{G}_2G_3\overline{G}_4\#P_{21}$ | Do. |
| | TIME SIGNAL OUTPUT |
| $= \#v_1G_1\overline{G}_2\overline{G}_3G_4\#P_{21}$ | Reads sign from integrand word for time signal output 3. |
| $= \#\overline{v}_1G_1\overline{G}_2\overline{G}_3G_4\#P_{21}$ | Do. |

| | |
|---|---|
| | TIME SIGNAL OUTPUT |
| $f_6 = \#v_1G_1\overline{G}_2G_3G_4\#P_{21}$ | Reads sign from integrand word for time signal output 4. |
| $\overline{f}_6 = \#\overline{v}_1G_1\overline{G}_2G_3G_4\#P_{21}$ | Do. |
| | INPUT—OUTPUT CONTROL |
| $g_1 = A_3\#P_{21}$ | The $G_1$ control bit is stored on the S track at $P_{20}$ but is delayed thru $A_3$ for one bit so that $G_1$ is set at the start of the next word. |
| $\overline{g}_1 = \overline{A}_3\#P_{21}+SP7$ | Do. |
| | INPUT—OUTPUT CONTROL |
| $g_2 = S\#P_{21}+SP7$ | Accepts control bit for start of next word. |
| $\overline{g}_2 = \overline{S}\#P_{21}$ | Do. |
| | INPUT—OUTPUT CONTROL |
| $g_3 = S\#P_{15} + \overline{A}_3\#P_{21}$ | Normal control bit stored on S track at $P_{15}$. $\overline{A}_3$ at $P_{21}$ contains $G_1$ control and $\overline{S}$ contains $G_2$. $\overline{G}_1\overline{G}_2$ designates first word of integration. |
| $\overline{g}_3 = \overline{S}\#P_{15}$ | Normal control bit stored on S track at $P_{15}$. |
| | INPUT—OUTPUT CONTROL |
| $g_4 = S\#P_{16} + \overline{A}_3\#P_{21}$ | Normal control bit stored on S track at $P_{16}$. $\overline{A}_3$ at $P_{21}$ contains $G_1$ control and $\overline{S}$ contains $G_2$. $\overline{G}_1\overline{G}_2$ designates first word of integration. |
| $\overline{g}_4 = \overline{S}\#P_{16} + \overline{G}_1\overline{G}_2G_3\#P_{21}$ | Normal control bit stored on S track at $P_{16}$. $\overline{G}_1\overline{G}_2G_3$ designate first word of integration with $G_4$. Resetting $G_4$ at $P_{21}$ indicates second word of integration follows. |

The invention provides, therefore, an improved input-output auxiliary computer system for use with a general purpose electronic digital computer. In the manner described, the improved input-output system of the invention extends the capabilities of the general purpose computer to enable the computer to be used, for example, in vehicle guidance systems. The improved input-output system of the invention serves to perform preliminary computations so as to provide, for example, velocity, distance, and time inputs to the digital computer. As described above, the input-output system of the invention is also capable of providing analogue guidance output information to the vehicle in response to the necessary computations by the computer.

We claim:

1. In a computer system, the combination of: a first circulating register for storing a plurality of multi-bit computer words in serial circulating manner, a second circulating register for storing a plurality of multi-bit computer words in serial circulating manner, timing means synchronized with said first and second registers for generating bit timing signals representative of the timing of the bits in the individual computer words circulating in said first and second circulating registers, first logic circuitry coupled to said timing means and to said first circulating register for introducing binary signals representative of said multi-bit computer words into said first register with a predetermined timing with respect to said computer words in said second register, the lengths of said registers having a particular relationship such that particular ones of the words in said first register line up with a particular portion of the successive words in said second register during successive circulations of said registers, and second logic circuitry coupled to said timing means and to said first and second registers for transferring binary signals from said first register to said second register with a timing to transfer respective ones of said words in said first register into the corresponding line up portions of said words in said first register.

2. The combination defined in claim 1 and which includes further logic circuitry for periodically shifting the contents of one of said circulating registers by a predetermined number of bit positions to prevent precession between the words circulating in said first and second circulating registers.

3. The combination defined in claim 1 and which includes further logic circuitry for periodically shifting the contents of said first circulating register by a bit position to prevent precession thereof with respect to the contents of said second circulating register, and means coupled to said second circulating register for introducing extraneous information into said second circulating register to be stored therein in the bit positions made available by the aforesaid shifting of the contents thereof by said further logic circuitry.

4. In combination: a memory drum for storing multi-bit binary signals thereon in at least one peripheral channel at successive bit positions in said channel, a bit counter including a plurality of flip-flops and logic circuitry intercoupling said flip-flops, said drum further having signals representative of at least one pair of binary bits recorded at selected bit positions in a further peripheral channel and respectively representing binary "1" and binary "0" a synchronizing circuit coupled to said further peripheral channel for deriving at least one of said bits of said pair and for introducing the same to said bit counter for establishing a particular relationship between said drum and said bit counter, and logic circuitry coupled to said bit counter and to said further channel for providing bit timing signals representative of said successive bit positions as determined by the relative states of said flip-flop in conjunction with the derivation of said binary bits from said further channel.

5. In combination: a memory for storing multi-bit binary signals in at least one channel thereon at successive bit positions in said channel, a bit counter including a plurality of bi-stable networks and logic circuitry intercoupling said networks, said memory further having signals representative of at least one pair of binary bits recorded at selected bit positions in a further channel and respectively representing binary "1" and binary "0," a synchronizing circuit coupled to said further channel for deriving at least one of said bits of said pair and for introducing the same to said bit counter for establishing a particular relationship between said memory and said bit counter, said bit counter and said further channel providing bit timing signals representative of said successive bit positions as determined by the relative states of said bi-stable networks in conjunction with the derivation of said binary bits from said further channel.

6. The combination of claim 4 and in which said memory drum includes a second further peripheral channel for storing clock pulses thereon at corresponding successive bit positions, and further synchronizing circuitry coupled to said second further peripheral channel and to said bit counter for introducing said clock pulses thereto to synchronize said bit counter with respect to said successive bit positions.

7. In combination: a memory drum for storing multi-bit binary signals thereon in a plurality of sectors in each of a plurality of peripheral channels at successive bit positions in each sector, a bit counter including a plurality of flip-flops and logic circuitry intercoupling said flip-flops, said drum further having signals representative of a pair of binary bits recorded in particular adjacent bit positions in each of a plurality of sectors in a further peripheral channel and respectively representing binary "1" and binary "0," a synchronizing circuit coupled to said further peripheral channel for deriving at least one of said bits of each pair and for introducing the same to said bit counter for establishing a particular relationship between said drum and said bit counter, and logic circuitry coupled to said bit counter and to said further channel for providing bit timing signals representative of said successive bit positions in each sector as determined by the relative states of said flip-flops in conjunction with the derivation of said binary bits from said further channel.

8. The combination of claim 4 and which includes a register for storing multi-bit binary signals, and circuit means coupled to said register and to said logic circuitry in said counter for transferring said multi-bit binary signals from said register to selected ones of said flip-flops in said counter at times corresponding to different bit timing indications of said counter to be stored in selected ones of said flip-flops.

9. In a computer system for utilizing a first series of pulses from at least one source and indicating positive increments of a particular function and for utilizing a second series of pulses from the source and indicating negative increments of the particular function, the combination of: a counter having a first output terminal and a second output terminal and including a plurality of individual inter-connected bi-stable stages representative of successive binary digits of varying significance and each capable of assuming a first and a second stable state; means for introducing the first series of pulses to the counter to cause the states of the stages thereof to be controlled in a predetermined progression in response to such pulses so that the counter is caused to indicate successive positive counts; means for introducing the second series of pulses to the counter to cause the state of the stages thereof to be controlled in a predetermined progression in response to such pulses so that the counter is caused to indicate successive negative counts; first matrix means connected to said first output terminal; second matrix means connected to said second output terminal; first circuit means connecting the one of said stages of said counter representing the most significant binary digit and selected other ones of the stages of said counter to said first matrix means to control the conductivity of said first matrix means and cause said first output terminal to assume a particular potential value only after the positive count of the counter sets said one stage representative of said most significant digit to its second state and further sets said selected other stages to said second state; and second circuit means connecting the one of the stages of said counter representative of said most significant binary digit and selected other ones of the stages of said counter to said second matrix means to control the conductivity of said second matrix means and cause said second output terminal to assume a particular potential value only after the negative count of the counter sets said one stage representative of the most significant digit to its first state and further sets said selected other ones of the stages to said first state.

10. The combination of claim 9 in which one of said further stages connected to said first and second matrix means is set to its second state during the positive count of the counter and is set to its first state during the negative count of the counter.

References Cited in the file of this patent

UNITED STATES PATENTS

| | | |
|---|---|---|
| 2,770,415 | Lindesmith | Nov. 13, 1956 |
| 2,954,166 | Eckdahl et al. | Sept. 27, 1960 |
| 2,972,718 | Alperin et al. | Feb. 21, 1961 |
| 2,995,729 | Steele | Aug. 8, 1961 |
| 3,023,371 | Balish et al. | Feb. 27, 1962 |